United States Patent
Peana et al.

(10) Patent No.: US 10,600,385 B2
(45) Date of Patent: Mar. 24, 2020

(54) SYSTEM AND METHOD FOR CONTEXTUALLY MANAGING DIGITAL DISPLAY BLUE LIGHT INTENSITY

(71) Applicant: Dell Products, LP, Round Rock, TX (US)

(72) Inventors: Stefan Peana, Austin, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 195 days.

(21) Appl. No.: 15/349,945

(22) Filed: Nov. 11, 2016

(65) Prior Publication Data

US 2018/0137837 A1 May 17, 2018

(51) Int. Cl.
*G09G 5/10* (2006.01)
*H05B 37/02* (2006.01)
(Continued)

(52) U.S. Cl.
CPC .............. *G09G 5/10* (2013.01); *G06F 3/147* (2013.01); *G09G 3/3413* (2013.01);
(Continued)

(58) Field of Classification Search
None
See application file for complete search history.

(56) References Cited

U.S. PATENT DOCUMENTS

| 5,387,920 A | 2/1995 | Bos |
| 2006/0104058 A1 | 5/2006 | Chemel |

(Continued)

FOREIGN PATENT DOCUMENTS

| WO | 2012/146256 | 11/2012 |
| WO | 2014/173883 | 10/2014 |
| WO | 2015187353 | 12/2015 |

*Primary Examiner* — YuJang Tswei
(74) *Attorney, Agent, or Firm* — Prol Intellectual Property Law, PLLC; H. Kenneth Prol

(57) ABSTRACT

A method of or an information handling system operating a contextual blue light management system comprising a digital display having a plurality of blue light emitters emitting light at a default luminous intensity to display a white point correlated color temperature and a memory for storing one or more internal data records correlating a blue light luminous intensity value with a preset adjusted display white point correlated color temperature, a defined condition under which to display the preset adjusted display white point correlated color temperature, and a preset duration of time for gradual shift of luminous intensity and operating the contextual blue light management system via a processor to receive and store in the one or more internal data records the preset adjusted display white point correlated color temperature, the defined condition under which to display the preset adjusted display white point correlated color temperature, and the preset duration of time, wherein the processor determines the defined condition has occurred and the graphics processing unit executes a gradual shift of luminous intensity of the plurality of the blue light emitters from the default luminous intensity to the blue light luminous intensity value of the preset adjusted display white point correlated color temperature correlated with the defined condition in the one or more internal data records over the preset duration of time.

20 Claims, 9 Drawing Sheets

(51) Int. Cl.
  *G09G 3/34* (2006.01)
  *G06F 3/147* (2006.01)
  *G06T 1/20* (2006.01)
(52) U.S. Cl.
  CPC ............ *H05B 37/0272* (2013.01); *G06T 1/20* (2013.01); *G09G 2320/064* (2013.01); *G09G 2320/0633* (2013.01); *G09G 2320/0666* (2013.01); *G09G 2320/0686* (2013.01); *G09G 2360/144* (2013.01); *G09G 2360/16* (2013.01); *G09G 2380/08* (2013.01); *H05B 37/02* (2013.01)

(56) References Cited

U.S. PATENT DOCUMENTS

| | | | |
|---|---|---|---|
| 2007/0115356 A1* | 5/2007 | Kang | G08B 13/19636 348/143 |
| 2009/0108269 A1* | 4/2009 | Negley | H01L 27/156 257/88 |
| 2009/0281604 A1 | 11/2009 | De Boer | |
| 2010/0289727 A1* | 11/2010 | Miller | G09G 3/2003 345/76 |
| 2013/0165741 A1 | 6/2013 | Seabury | |
| 2013/0271004 A1* | 10/2013 | Min | H05B 33/0842 315/112 |
| 2014/0043354 A1* | 2/2014 | Choi | G09G 5/02 345/590 |
| 2014/0052220 A1 | 2/2014 | Pedersen | |
| 2014/0101611 A1 | 4/2014 | Lang | |
| 2014/0254139 A1 | 9/2014 | Park | |
| 2014/0292637 A1* | 10/2014 | Peng | G02B 27/0172 345/156 |
| 2014/0353636 A1 | 12/2014 | Baek | |
| 2015/0348468 A1 | 12/2015 | Chen | |
| 2017/0202075 A1* | 7/2017 | Zhou | G06T 7/90 |

\* cited by examiner

| BLUE LIGHT INTENSITY | CORRELATED COLOR TEMPERATURE (CCT) OF WHITE POINT |
|---|---|
| 100% | 4000K |
| 90% | 3900K |
| 85% | 3800K |
| 80% | 3700K |
| 75% | 3400K |
| 70% | 3200K |

SYSTEM AND METHOD FOR CONTEXTUALLY MANAGING DIGITAL DISPLAY BLUE LIGHT INTENSITY

FIELD OF THE DISCLOSURE

The present disclosure generally relates to information handling systems, and more particularly relates to a system and method of contextually managing digital display blue light intensity.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
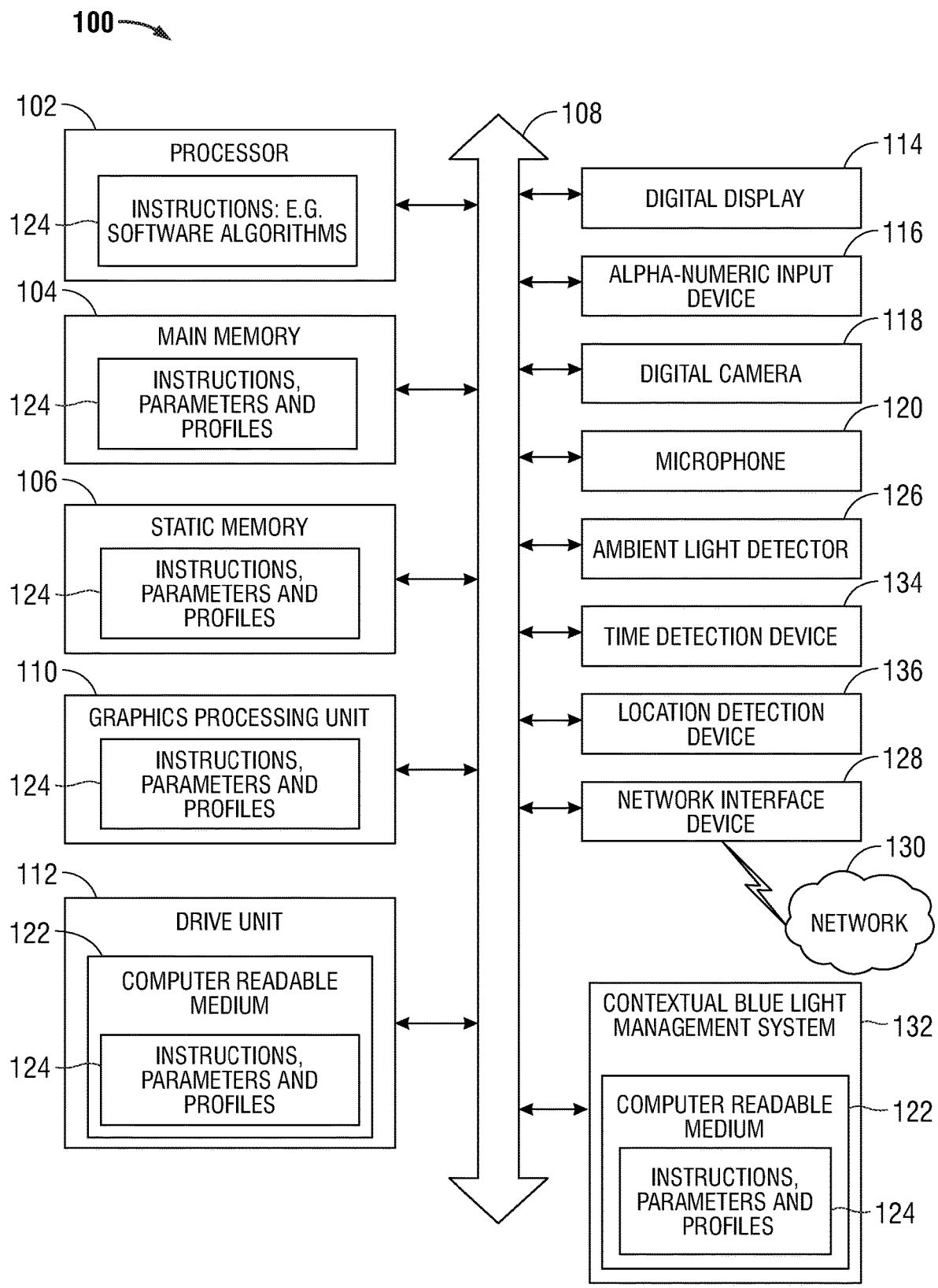
FIG. 1 illustrates a generalized embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Changes in the daily light cycle can influence a person's mood, sleep patterns, and immune system, among other physiological responses. Humans detect ambient light by photosensitive ganglion cells that project to brain regions where circadian rhythms are entrained, and to limbic areas which generally regulate mood. It is known that changes in the color temperatures of ambient light may affect sleep patterns, learning capabilities, and synaptic plasticity. The color temperature of "white light" emitted from a digital display device may similarly affect sleep patterns.

The color temperature of a light source is defined as the temperature of an ideal black-body radiator that radiates light of comparable hue to the light source. Color temperature is a characteristic of visible light expressed in the unit of measure for temperature kelvin (K). Color temperatures over 5000 K are called "cool colors," and often have a bluish white hue, while lower color temperatures around 3000 K are called "warm colors," and often appear yellowish-white to red. When a person perceives a high color temperature by detecting "cool colors" in the ambient light, their ganglion cells transmit information to the brain regions regulating circadian rhythm that it is early in the day and the person should remain awake. When a person perceives a lower color temperature by detecting "warm colors" in the ambient light, their ganglion cells may transmit information to the brain indicating the night is approaching and the person should begin to prepare for sleep.

The color temperature of a digital display may be referred to as a "coordinated color temperature" or CCT. To create white light in a digital display, often multiple sources of colored light are employed, such as, for example, a light corresponding to each of the colors red, blue, and green. On many digital displays, a red light emitter, a blue light emitter, and a green light emitter are each energized at different levels to generate an additive color that can be perceived by the human eye, including various shades of white. A visual stimulus corresponding to a perceivable color can be described in terms of the energy emission of a light source that gives rise to the visual stimulus. One measure of describing the perceived strength of a visual stimulus, or in other words, the color emitted, based on the energy emitted from a light source that gives rise to the visual stimulus, is referred to as "luminous intensity."

Each of the red, blue, and green light emitters in a digital display may emit light simultaneously, generating a combined light equivalent to any color perceivable by the human eye. For example, simultaneously emitting light of a specific luminous intensity from each of the red, blue, and green light emitters may result in emission of light perceived by the human eye to be "white." It is possible to correlate a given CCT of a digital display with a wavelength and luminous intensity of each of the red, blue, and green light sources contributing to the combined light emission. The combined color resulting from simultaneous emission of the red, blue, and green light emitters may be affected by altering the wavelength of the light emitted from one or more of the light emitters, or by altering the luminous intensity of the light emitted by one or more of the light emitters without altering the wavelength of the light emitted from any of the light emitters.

Each digital display may have a "white point," which is a point on a CIE color map lying within a region in which light is perceived as "white." Each digital display may have a different white point, each having a separate position on the CIE color chart. Each digital display may respond to an instruction from a graphics processing unit to emit light having the chromaticity of its "white point" on the CIE color map by emitting light of a specifically defined luminous intensity and a specifically defined wavelength from each of the red, blue, and green light emitters in the digital display. Most digital displays come with a factory preset definition of its "white point," which provides the specific definitions of luminous intensity and wavelength of light emitted from each of the red, blue, and green light emitters that are necessary to produce light having the chromaticity of its factory preset white point.

Many digital display devices, such as tablets, smartphones, all-in-one PCs (AIO PCs), and computing device digital displays have factory preset white points guided toward high brightness and the "cooler colors" associated with CCTs greater than 3500 K. When used close to bedtime, this high CCT value may disrupt a user's regular sleep pattern or mood, potentially causing other physiological effects. A system is needed to reduce these effects. "For example, a system embodiment for benefit with causing minimal disruption to user experience includes a gradual or stepped shift."

Such a system may solve this problem by changing the CCT value of the digital display white point from a bluish hue to the warmer colors upon occurrence of a specific condition preset by the user, such as the occurrence of a certain time of day, an ambient light detector detecting a change in the ambient light around the computing device, or a processor determining through digital images, microphones, or other biometric device readings that the user is growing tired (e.g., detecting the user yawning or blinking with greater frequency). Such a system may also determine the user's geographic location, for example, if they are travelling, and modify the CCT shift to occur at a certain time in the user's current geographic location. Such a system may also determine which application the user is using at the time the pre-set condition occurs, and if that application involves graphics-intensive display capabilities, may override the instruction to shift the CCT, and allow the CCT to remain in the higher values.

In the present disclosure, a contextual blue light management system is established to alter the CCT of a digital display operatively connected to the contextual blue light management system upon the occurrence of a pre-set customized condition. In one example embodiment, the contextual blue light management system may include several modules, including, but not limited to a user identification module, a shifting condition definition module, a shifting condition detection module, a peripheral sensor/light source interface device module, and a light intensity shifting module. In such an embodiment, the user identification module may operate to receive user input via an operatively connected control device, such as an alpha-numeric input device, and to identify the current user of the system. In such a way, a contextual blue light management system in an embodiment may tailor changes in the CCT of a digital display to the circadian rhythm of each individual user.

The shifting condition definition module in an embodiment may operate to receive user input and to record the user input in an internal data record stored in memory such as a blue light intensity shift condition table. In an embodiment, the shifting condition definition module may record user input indicating a number of conditions upon which the user wishes the digital display to change its CCT, the CCT to which the user wishes the digital display to change upon the occurrence of such a condition, and the duration of time over which the user wishes that change to occur. The shifting condition definition module in an embodiment may also operate to record factory-defined input of the same type, rather than user-defined input.

The shifting condition detection module in an embodiment may operate to identify when one of the conditions listed in the blue light intensity shift condition table has occurred. For example, the shifting condition detection module in an embodiment may operate to identify when any one or more of the following conditions have occurred: signs of increased user lethargy, measurement of the coordinated color temperature of the ambient light surrounding the display device, occurrence of a preset time, occurrence of a preset time in a given location, and/or measurement of the CCT of a nearby IOT digital display device.

The peripheral sensor/light source interface device module in an embodiment may operate to communicate with one or more nearby devices within the "internet of things" (IOT). Such IOT devices may include, but may not be limited to IOT external sensors, and/or IOT external light sources. The peripheral sensor/light source interface device module in an embodiment may communicate with these nearby IOT devices via the network interface device of the information handling system, and a commonly shared net-work. In an embodiment, the peripheral sensor/light source interface device module may further operate to receive measurements of the CCT of an IOT external light source, and to commu-nicate instructions to the IOT external light source to change its CCT to match the CCT of the digital display operatively connected to the contextual blue light management system. In a further embodiment, the periph-eral sensor/light source interface device module may also operate to receive various measurements from an IOT external sensor, including but not limited to captured images of the user, captured sound recordings of the user, ambient light measurements, time detection measurements, and/or location detection measure-ments. Any of these measure-ments received from an IOT external sensor may be com-municated to the shifting con-dition detection module in order to determine whether any of these measurements corresponds with a preset condition listed in the blue light intensity shift condition table.

The light intensity shifting module in an embodiment may operate to instruct the graphics processing unit of the information handling system to shift the CCT of the digital display to the user-defined, adjusted white point preset coordinated color temperature located in the blue light intensity shift condition table upon the occurrence of an associated preset condition, over the associated shift dura-tion. In a further embodiment, the light intensity shifting module may operate in tandem with the peripheral sensor/light source interface device module in order to instruct an IOT external light source to shift its CCT to match the CCT of the digital display operatively connected to the graphics processing unit and the contextual blue light management system.

The light intensity shifting module in an embodiment may instruct the graphics processing unit to shift the CCT of the digital display over the associated shift duration following one of several different shift progressions. For example, the light intensity shifting module in an embodiment may instruct the shift to occur in a linear progression, a curvi-linear progression, or a step progression. A linear progres-sion in an embodiment may involve shifting the CCT at a constant pace over the set shift duration. A curvilinear progression in an embodiment may involve shifting the CCT at an increasing or decreasing pace over the set shift duration such that the CCT may shift slowly at the beginning of the shift duration and shift relatively faster toward the end of the shift duration.

A step progression in an embodiment may involve shift-ing the CCT in steps, each step occurring at different time increments during the set shift duration.

For example, the gradual shift may progress in steps over the preset duration of time, whereby the shift occurs at intervals that may be equal, or in unequal intervals or in bursts, each interval or burst occurring at a certain time during the course of the preset duration of time. With a stepped gradual shift over time, the need for continual processing to effect a gradual change is relieved and replaced with a series of shift steps that gradually reach the target adjusted white point preset coordinated color tem-perature at the end of the duration. As another aspect, each burst may occur at a certain time whereby the certain time interval is dictated by the occurrence of a second defined condition.

Examples are set forth below with respect to particular aspects of an information handling system for limiting battery charging of computing devices during storage and shipping states.

FIG. 1 illustrates a generalized embodiment of informa-tion handling system 100. For purpose of this disclosure information handling system 100 can include any instru-mentality or aggregate of instrumentalities operable to com-pute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device, or other consumer electronic device, a network server, a network storage device, a switch router or other network communication device, or any other suit-able device and may vary in size, shape, performance, functionality, and price. Further, information handling sys-tem 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable media for storing machine-executable code, such as software or data. Addi-tional components of information handling system 100 can include one or more storage devices that can store machine-executable code, one or more communications ports for communicating with external devices, and various input and output (110) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an informa-tion handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in indi-vidual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. The infor-mation handling system 100 may further include as another processor a graphics processing unit (GPU) 110 operating to control the spectral characteristics of the digital display 114, including the digital display white point correlated color temperature. Any of the processing resources may operate to execute code that is either firmware or software code. Moreover, the information handling system 100 can include memory such as main memory 104, static memory 106, computer readable medium 122 of the contextual blue light management system 132, and drive unit 112 (volatile (e.g. random-access memory, etc.), nonvolatile (read-only memory, flash memory etc.) or any combination thereof). Additional components of the information handling system can include one or more storage devices such as static memory 106, computer readable medium 122 of the contextual blue light management system 132, and drive unit 112. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include one or more digital displays 114. The digital display(s) 114 in an embodiment may function as a liquid crystal display (LCD), an organic light emitting diode (OLED), a flat panel display, a solid state display, or a cathode ray tube (CRT). In some embodiments, the information handling system 100 may include a plurality of digital displays or a single, foldable digital display across two display housings. The information handling system may have a form factor of having a foldable single or two or more digital display screens with various available orientations. Additionally, the information handling system 100 may include an alpha numeric input device 116, such as a keyboard, a cursor control device, touchpad, or gesture or touch screen input, a microphone 120, and an ambient light detector 126.

The information handling system can include a digital camera 118 to capture images in the information handling system, such as a RGB camera, an infrared digital camera, a telephoto lens digital camera, a fish-eye digital camera, a wide-angle digital camera, a close-focus digital camera, an array camera such as a CMOS array camera or an array camera composed of other light sensors, or any other type of two-dimensional digital camera. The information handling system can also include at least one two-dimensional RGB camera in combination with a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art.

The information handling system can also include a time detection device 134, and a location detection device 136. A time detection device 134 may include a clock, calendar, internal chronometer, or other timing device. A location detection device 136 may include any form of location detection circuitry, including, but not limited to a Global Position System Receiver, IEEE 802.11 transceiver circuitry, or other location detection circuitry.

Network interface device 128 represents a NIC disposed within information handling system 100, on a main circuit board of the information handling system, integrated onto another component such as processor 102, in another suitable location, or a combination thereof. The network interface device 128 can include another information handling system, a data storage system, another network, a grid management system, another suitable resource, or a combination thereof. Network interface device 128 in an embodiment may operably connect to a network 130.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. In another embodiment, application programs and BIOS/FW code reside in another storage medium of information handling system 100. For example, application programs and BIOS/FW code can reside in static memory 106, drive 120, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 112 or in a storage system (not illustrated) associated with network interface device 128 or any combination thereof. Application programs 124, and BIOS/FW code instructions 124 can each be implemented as single programs, or as separate programs carrying out the various features as described herein. Application program interfaces (APIs) such Win 32 API may enable application programs 124 to interact or integrate operations with one another.

In an example of the present disclosure, the processor 102, the graphics processing unit 110, or some combination of the CPU and GPU may execute code instructions of the contextual blue light management system 132 as disclosed herein, and an API may enable interaction between the application program and device drivers and other aspects of the information handling system and a contextual blue light management system 132 thereon. In one example embodiment, the GPU 110 may conduct calculation of determination of conditions to trigger a shift of blue light intensity as well as determine the blue light intensity shift for images to be sent to the digital display or displays 114. Several of the inputs may be received by the contextual blue light management system 132 operating on the GPU in such an embodiment and the timed, gradual or stepped shift of blue light intensity conducted for the image frames by the GPU and placed on a display buffer for the digital display. In other embodiments, some or all of the contextual blue light management system 132 may operate as a set of code instructions in software, firmware or hardwired to execute any portion of the determination that a blue light intensity shift may be triggered, or that some or all of the blue light shift may be impeded. In an example embodiment, the pre-set conditions for triggering a blue light luminescence intensity shift may be stored in a display EDID file and determination of the inputs and conditions to trigger a shift may be conducted via an application program or firmware executed by a CPU 102 or other controller or processor. In some example embodiments, the GPU 110 may nonetheless conduct the blue light luminescence shifting along with display drivers as understood by those of skill. In a further aspect, the information handling system 100 may operate as a standalone device or may be connected, such as via a network, to other computer systems or peripheral devices which may in some embodiments conduct aspects of the contextual blue light management system 132 and other embodiments described herein including with processor or controller capabilities of IOT devices such as smart lighting systems for nearby ambient lighting.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The contextual blue light management system 132 and the disk drive unit 112 may include a computer-readable medium 122 such as a magnetic disk in an example embodiment. The computer-readable medium of the main memory 104, static memory 106, drive unit 112, and contextual blue light management system 132 may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The contextual blue light management system 132 computer readable medium 122 may also contain space for data storage, such as an internal data record for an intensity CCT correlation table, and/or an internal data record for a blue light intensity shift condition table. The information handling system 100 may also include a contextual blue light management system 132 that may be operably connected to the bus 108. The contextual blue light management system 132 may perform tasks related to shifting the coordinated color temperature ("CCT") of the digital display 114 upon the occurrence of a preset condition, over a preset duration of time. In an embodiment, the contextual blue light management system 132 may communicate with the main memory 104, the processor 102, the GPU 110, the digital display 114, the alpha-numeric input device 116, the digital camera 118, the microphone 120, the ambient light detector 126, the time detection device 134, the location detection device 136, and the network interface device 128 via bus 108, and several forms of communication may be used, including ACPI, SMBus, or shared memory.

In other aspects, the contextual blue light management system 132 other applications may interact with system sensor module having various orientation sensors (not shown). Various orientation sensors are included in this module to assist with determining the relative orientation of the information handling system and the orientation of one or more digital displays 114. Orientation sensors may include motion sensors, image sensors, and sound sensors 156. The sensor system module is a sensor hub, or an accumulator device, that collects raw data from connected orientation sensors, and organizes and processes data received from the connected sensors. The sensor hub also processes raw sensor data to groom the raw sensor data into a useable form of positional analysis for the display information handling system and its display screen or screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset 102 via a bus 108 connection such as an Inter-Integrated Circuit (I2C) bus or other suitable type of multi-master bus connection.

A relative orientation of the information handling system in space, the orientation of the one or more digital displays 114 with respect to one another, consideration of state of usage activity data, and working software application context are determined by the sensor hub and may be used to determine a display orientation for the contextual blue light management system 132. This relative orientation data of the display or displays 114 of the information handling system 100, the state of usage activity data, and the working software application context are used by the contextual blue light management system 132 to determine ambient light source locations or may be used as an additional input to determine suitability for luminous intensity shifting according to embodiments herein of the contextual blue light management system 132.

In another embodiment, system 10 may also include microphones and speakers for audio input and output (not shown). The microphones and speakers are connected through an HDA Codec such as the Realtek ALC 5642 or similar such codec. Data from the microphones may serve motion sensing using a Doppler Effect detection of digital display locations.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
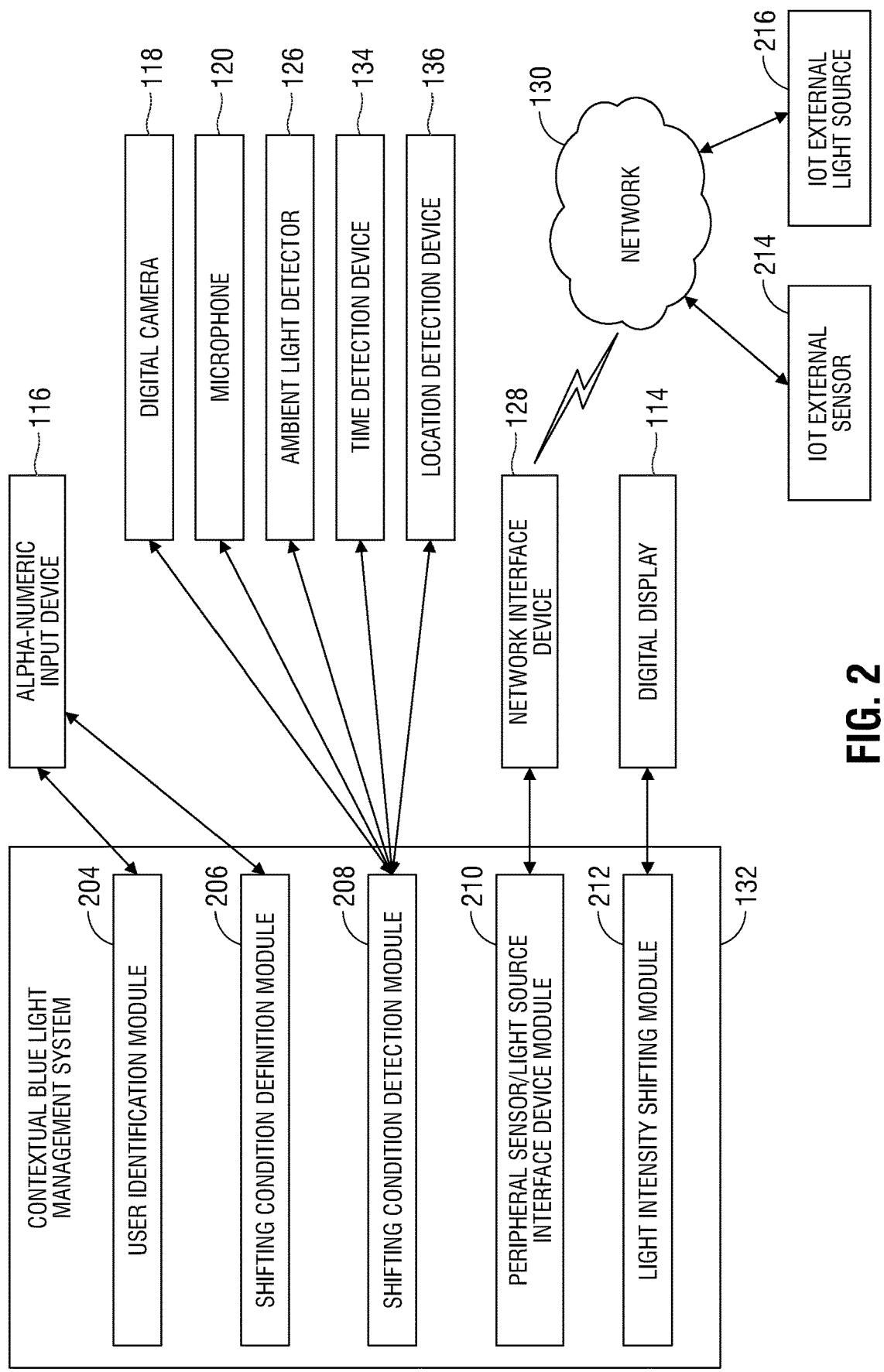
FIG. 2 is a block diagram illustrating a contextual blue light management system according to an embodiment of the present disclosure.

FIG. 2 is a block diagram illustrating a contextual blue light management system according to an embodiment of the present disclosure. In an embodiment, and as shown in FIG. 2, a contextual blue light management system 132 may contain application modules, including, but not limited to a user identification module 204, a shifting condition definition module 206, a shifting condition detection module 208, a peripheral sensor/light source interface device module 210, and/or a light intensity shifting module 212. As described above, the information handling system may include one or more buses operable to transmit communications between the various hardware components, such as communications between the contextual blue light management system 132 and any one of the alpha-numeric input device 116, the digital camera 118, the microphone 120, the ambient light detector 126, the time detection device 134, the location detection device 136, the network interface device 128, the digital display 114, or other sensors and components of an information handling system or operatively coupled thereto.

In an embodiment, the user identification module 204 may operate to receive user identification information via the alpha-numeric input device 116. The shifting condition definition module 206, in an embodiment, may operate to record user input via the alpha-numeric input device 116 and to store the user input in an internal data record such as a blue light intensity shift condition table stored in main memory. The user input stored in the blue light intensity shift condition table may include, but may not be limited to a user-defined, adjusted white point preset coordinated color temperature the user wishes the digital display to emit upon the occurrence of a preset condition, the user-defined preset condition (or context) upon the occurrence of which the digital display should emit blue light sufficient to generate the user-defined, adjusted white point preset coordinated color temperature, and the user-defined duration of time during which the user wishes the digital display to shift to the user-defined, adjusted white point preset coordinated color temperature from the default or other white point coordinated color temperature.

The shifting condition definition module 206 may further receive orientation data relating to the orientation of one or more digital display devices for the information handling system. The display orientation may be received from information handling system or display system orientation sensors including motion sensors, accelerometers, gyroscopes, hinge angle detection systems, geo-magnetic or GPS systems, imaging systems, audio systems and the like to determine information handling system orientation in space and for one or more digital displays with respect to each other. In some embodiments, an orientation determination may indicate a location of ambient light with respect to the digital display screen or for determining if there are a plurality of digital display screens the relative impact of each display screen on the other(s) when compensating for luminous intensity shifts or color correction. Orientations of the information handling system may include a desktop orientation such as one facing a user, a book (with a plurality of display screens) or tablet orientation where one or more displays are facing a user but more likely working in a more casual setting, or a tabletop orientation where the display screen or screens face external light source or sources directly but the information handling system is being used at a desk or table. In one set of embodiments, the information handling system orientation may in some cases impact whether a shift in luminous intensity according to the contextual blue light management system is warranted. For example, a tabletop orientation or desktop may indicate a user is working and a blue light shift may be unwelcome by the contextual blue light management system. A book or tablet orientation may indicate a more casual usage where initiation of a contextual blue light management system is more acceptable.

The shifting condition detection module 208 in an embodiment may operate to receive digital images of the user via the digital camera 118. In such an embodiment, the shifting condition detection module 208 may also analyze the digital images of the user to identify signs of increased user lethargy, such as increases in blinking, pupil-dilation, or yawning. In another aspect of an embodiment, the shifting condition detection module 208 may operate to receive audio sound recordings of the user via the microphone 120, and to analyze those audio sound recordings to identify signs of increased user lethargy, including audible yawning or increasing or extended episodes of silence or auditory inactivity, regular breathing, lack of typing or clicking or the like. In another aspect of an embodiment, the shifting condition detection module 208 in an embodiment may operate to receive measurements of the ambient light surrounding the digital display via the ambient light detector 126, and to determine the coordinated color temperature of the ambient light measured. In another aspect, the shifting condition detection module 208 may operate to receive time measurements via the time detection device 134, and to determine when a preset time condition occurs. In yet another aspect, the shifting condition detection module 208 may operate to receive location information via the location detection device 136, correct the time measurement received by the time detection device 134 by compensating for the time zone in which the identified location lies, and determining when a preset time condition at that location occurs.

In an embodiment, the shifting condition detection module 208 in an embodiment may operate to access the internal data record generated by the shifting condition definition module 206 called the blue light intensity shift condition table, including, but not limited to a user-defined, adjusted white point preset coordinated color temperature the user wishes the digital display to emit upon the occurrence of a preset condition, the user-defined preset condition (or context) upon the occurrence of which the digital display should emit blue light sufficient to generate the user-defined, adjusted white point preset coordinated color temperature, and the user-defined duration of time during which the user wishes the digital display to shift to the user-defined, adjusted white point preset coordinated color temperature from any other coordinated color temperature. In yet another aspect, the shifting condition detection module 208 may associate a reading, measurement, or result of analysis of a digital image or audio recording with a user-defined preset condition (or context) upon the occurrence of which the digital display should emit blue light sufficient to generate the user-defined, adjusted white point preset coordinated color temperature listed in the blue light intensity shift condition table generated by the shifting condition definition module 206, and communicate the occurrence of that particular condition to the light intensity shifting module 212.

The peripheral sensor/light source interface device module 210 may operate to communicate with the network interface device 128, and the network 130. The network 130 may further communicate with one or more devices within the "Internet of Things" (IOT). For example, the network 130 may communicate with an IOT external sensor 214, which may include but not be limited to a digital camera, a microphone, an ambient light detector, a time detection device, or a voice recognition system. As another example, the network 130 may communicate with an IOT external light source 216, which may include but not be limited to a remote digital display such as flat panel television, or a home or office lighting system. The IOT external light source 216 in an embodiment may have an adaptive color gamut in which a graphics processor operatively connected to the IOT external light source 216 is capable of altering the white point correlated color temperature of the IOT external light source.

In an embodiment, the peripheral sensor/light source interface device module 210 may operate to receive sensor information from the IOT external sensor 214, including but not limited to digital images of areas and individuals surrounding a remote digital camera IOT device, audio recordings of areas and individuals surround-ing a remote microphone IOT device, measurements of ambient light of areas surrounding a remote ambient light detector IOT device, time measurements from a remote time detection IOT device, and/or location information from a remote location detection IOT device. In another aspect of an embodiment, the peripheral sensor/light source interface device module 210 may operate to instruct an IOT external light source 216 to shift the blue light intensity displayed by the IOT external light source 216, generating a warmer or cooler coordinated color temperature CCT of the IOT external light source 216.

The light intensity shifting module 212 in an embodiment may operate to receive a communication from the shifting condition detection module 208 that a specific user-defined preset condition (or context) upon the occurrence of which the digital display should emit blue light sufficient to generate the user-defined, adjusted white point preset coordinated color temperature listed in the blue light intensity shift condition table generated by the shifting condition definition module 206 has occurred. In another aspect, the light intensity shifting module 212 may also access the internal data record generated by the shifting condition definition module 206, called the blue light intensity shift condition table, including, but not limited to a user-defined, adjusted white point preset coordinated color temperature the user wishes the digital display to emit upon the occurrence of a preset condition, the user-defined preset condition (or context) upon the occurrence of which the digital display should emit blue light sufficient to generate the user-defined, adjusted white point preset coordinated color temperature, and the user-defined duration of time during which the user wishes the digital display to shift to the user-defined, adjusted white point preset coordinated color temperature from any other coordinated color temperature. The light intensity shifting module 212 in an embodiment may correlate the specific user-defined preset condition the shifting condition detection module 208 indicated has occurred with the user-defined, adjusted white point preset coordinated color temperature and duration of blue light shift associated with that specific user-defined preset condition.

In an embodiment, the light intensity shifting module 212 may also access an internal data record called an intensity CCT correlation table, which may associate each of various white point correlated color temperatures with a blue light intensity that may contribute to the production of that correlated color temperature when emitted from the digital display. The light intensity shifting module 212 may then instruct the digital display to shift the intensity of the blue light it emits to the intensity associated with the display white point preset correlated color temperature, over the time period equivalent to the user-defined preset duration of time listed in the blue light intensity shift condition table. In another aspect, the light intensity shifting module 212 may also instruct the peripheral sensor/light source interface device module to pass a command to the IOT external light source 216 to similarly shift its white point correlated color temperature to the user-defined white point preset coordinated color temperature, over the time period equivalent to the user-defined preset duration of time listed in the blue light intensity shift condition table.

The light intensity shifting module in an embodiment may instruct the graphics processing unit to shift the CCT of the digital display over the associated shift duration following one of several different shift progressions. For example, the light intensity shifting module in an embodiment may instruct the shift to occur in a linear progression where the shift occurs at a constant pace, a curvilinear progression where the shift occurs at an increasing or decreasing pace over the set duration, or a step progression, each step occurring at different time increments during the set shift duration. In a further embodiment, the percentage value of the decrease at each time increment may be preset, and/or the time increments may be preset. For example, in an embodiment, the light intensity shifting module may instruct the display to decrease the white point CCT over the preset duration of shift following a linear progression, until the shifting condition detection module detects signs of user fatigue. Upon the detection of user fatigue, the light intensity shifting module may instruct the display to change the progression of the shift of the white point CCT to follow a step progression, and immediately decrease the white point CCT by a preset percentage value, such as 50%.

Figure 3:
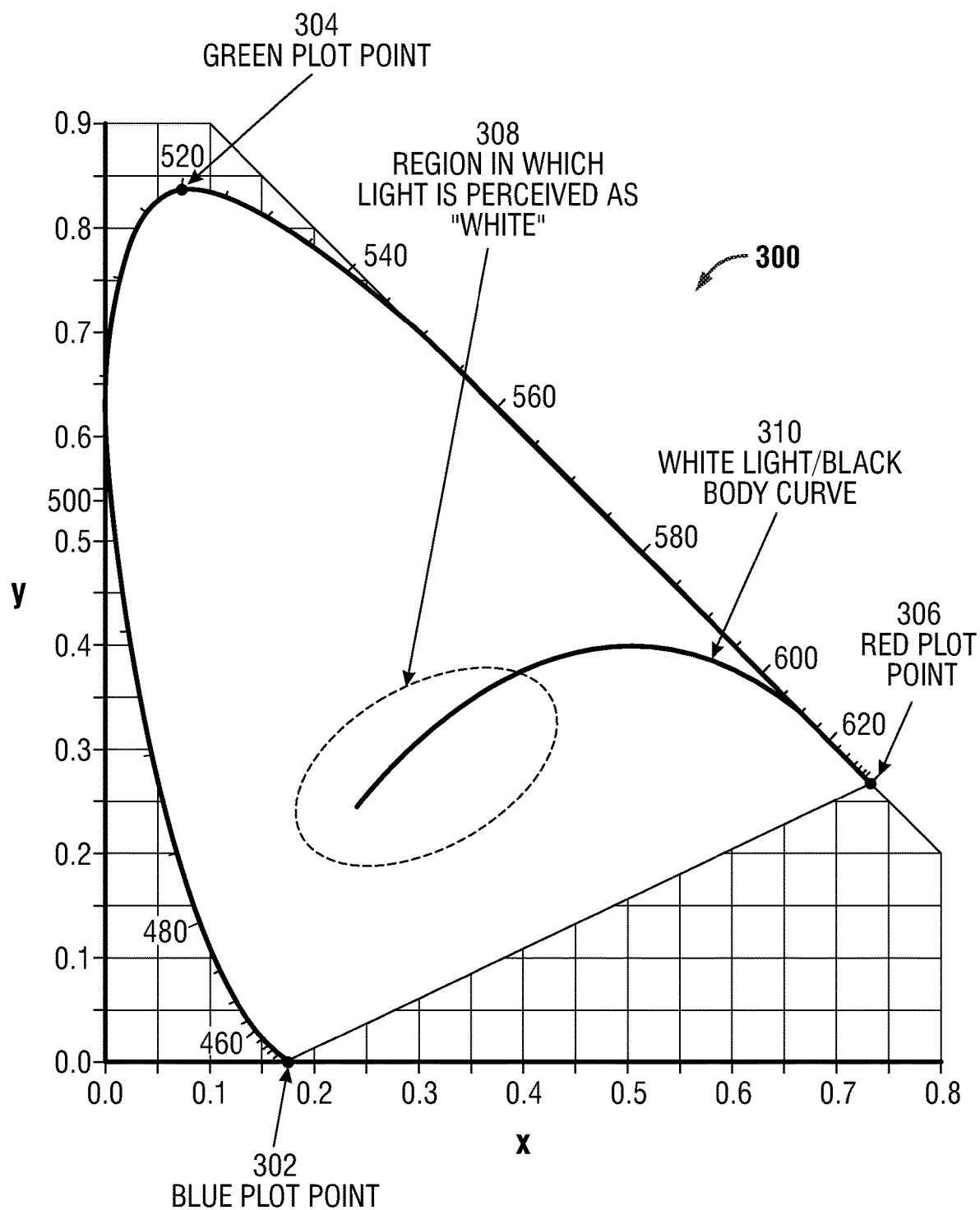
FIG. 3 is an example of a color model within an International Commission on Illumination (CIE) coordinate system, according to an embodiment of the present disclosure.

FIG. 3 is an example of a color model within a CIE coordinate system, according to an embodiment of the present disclosure. As discussed above, to create white light, often multiple sources of colored light are employed, such as, for example, a light corresponding to each of the primary colors of red, blue, and green. On many digital displays, a red light emitter, a blue light emitter, and a green light emitter are each energized at different levels to generate an additive color that can be perceived by the human eye, including various shades of white. A visual stimulus corresponding to a perceivable color can be described in terms of the energy emission of a light source that gives rise to the visual stimulus. One measure of describing the perceived strength of a visual stimulus, or in other words, the color emitted, based on the energy emitted from a light source that gives rise to the visual stimulus, is referred to as "luminous intensity."

One example of a commonly used model for expressing color is illustrated by the CIE color model shown in FIG. 3, and is based on the CIE color system that associates perceived color with both wavelengths emitted by a light source, and the luminous intensity with which the light source emits that particular wavelength. For example, the blue plot point 302 shown in FIG. 3 depicts emission of a single light source emitting light at a wavelength of 425 nanometers, is associated with the color that the three different types of cone receptors in the human eye perceive as blue. As another example, the green plot point 304 shown in FIG. 3 depicts emission of a single light source emitting light at a wavelength of 530 nanometers, is associated with the color that the three different types of cone receptors in the human eye perceive as green. As yet another example, the red plot point 306 shown in FIG. 3 depicts emission of a single light source emitting light at a wavelength of 650 nanometers, is associated with the color that the three different types of cone receptors in the human eye perceive as red.

In one implementation, the CIE system characterizes a given visual stimulus, such as a perceived color, by a luminance parameter Y and two chromaticity coordinates x and y (associated with the x and y axes of the chart depicted in FIG. 3) that specify a particular point on the color model shown in FIG. 3. The values x, y, and Y can be identified using the following formulas:

$$X = \int_0^\infty I(\lambda)\bar{x}(\lambda)\delta\lambda$$

$$Y = \int_0^\infty I(\lambda)\bar{y}(\lambda)\delta\lambda$$

$$Z = \int_0^\infty I(\lambda)\bar{z}(\lambda)\delta\lambda$$

-continued $$x = \frac{X}{X+Y+Z}$$

and $$y = \frac{Y}{X+Y+Z}$$

where I(λ) is the spectral power distribution (Watt/nm) of the light, λ is the wavelength of the light, and x(λ), y(λ), and z(λ) are the CIE 1931 Standard Colorimetric Observer XYS functions.

In an embodiment, one of each of the red, blue, and green light emitters may emit light simultaneously, generating a combined light equivalent to any color depicted in the CIE color model and perceivable by the human eye (although FIG. 3 depicts the color model in black and white, the true color model identifies the full spectrum of color visible to the human eye, each located within the confines of the curve running between the blue plot point 302, green plot point 304, and red plot point 306 of FIG. 3). For example, as shown in FIG. 3, simultaneously emitting light of a specific luminous intensity from each of the red, blue, and green light emitters may result in emission of light perceived by the human eye to be "white." The emission of light perceived by the human eye to be "white" may be characterized in FIG. 3 by the region 308 in which light is perceived as "white." White light falling within region 308 may have varying hues, referred to as "color temperatures" ranging from bluish-white, or cool temperatures, to yellow-white or red-white, or warm temperatures. The color temperature of a given white light visual stimulus conventionally is characterized according to the temperatures in degrees Kelvin (K) of a black body radiator that radiates essentially the same spectrum as the white light visual stimulus shown in the color chart. White light/black body curve 310 in FIG. 3 illustrates the CIE coordinates of a black body radiator at various temperatures in Kelvin.

Figure 4:
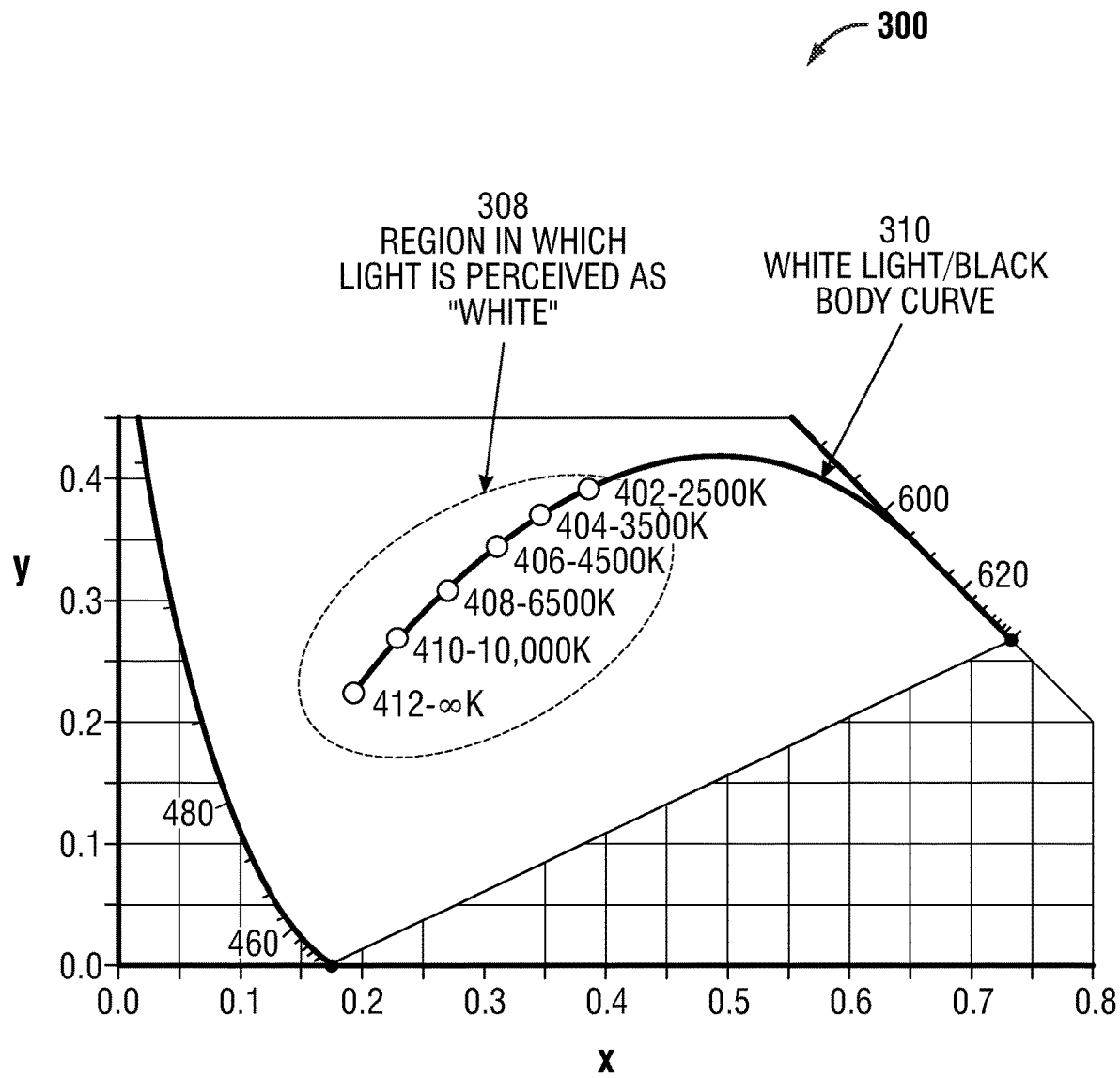
FIG. 4 is an example of a white light/black body curve mapped onto a color model within a CIE coordinate system, according to an embodiment of the present disclosure.

FIG. 4 is an example of a white light/black body curve mapped onto a color model within a CIE coordinate system, according to an embodiment of the present disclosure. As shown in FIG. 4, the white light/black body curve 310 illustrates the CIE coordinates of a black body radiator emitting colors falling within the region 308 in which light is perceived as white. Although not visible from the black and white FIG. 4, the area closest to the top right of region 308 have yellow and red hues, associated with warmer coordinated color temperatures, and the area closest the bottom left of region 308 has blue hues, associated with cooler coordinated color temperatures. FIG. 4 illustrates the color temperatures in degrees Kelvin (K) of a black body emitting the color behind each of the points 402-412, located along the white light/black body curve 310. For example, the temperature of a black body emitting the warmer color temperatures associated with the upper right area of region 308, shown beneath point 402 have a temperature of 2500K. As the white light black body curve 310 extends further into the region 308 and toward the blue side of the spectrum, the color temperature steadily climbs, as depicted by the increasing temperatures from 3500K at point 404, 4500K at point 406, 6500K at point 408, and 10,000K at point 410. The white light/black body curve ends at point 412, which theoretically indicates an infinite color temperature value.

As discussed above, simultaneously emitting light of a specific luminous intensity from each of the red, blue, and green light emitters may result in emission of light having CIE coordinates within the region 308 and along the white light/black body curve 310. Using FIGS. 3 and 4 and the above equations, it is possible to correlate a given coordinated color temperature along the white light/black body curve 310 of a combined light emission with a wavelength and luminous intensity of each of the red, blue, and green light sources contributing to the combined light emission. The combined color resulting from simultaneous emission of the red, blue, and green light emitters may be affected by altering the wavelength of the light emitted from one or more of the light emitters, or by altering the luminous intensity of the light emitted by one or more of the light emitters without altering the wavelength of the light emitted from any of the light emitters.

Figure 5:
FIG. 5 is a graphical diagram illustrating an intensity coordinated color temperature correlation table according to an embodiment of the present disclosure.

FIG. 5 is a graphic diagram illustrating an intensity CCT correlation table according to an embodiment of the present disclosure. In an embodiment, the intensity CCT correlation table 500 may associate each of two or more white point correlated color temperatures (CCTs) with a percentage value of blue light intensity. As discussed above, each digital display may have a "white point," which is a point on a CIE color map lying within the region in which light is perceived as "white." Each digital display may have a different white point, each having a separate position on the CIE color chart. Each digital display may respond to an instruction from a graphics processing unit to emit light having the chromaticity of its "white point" on the CIE color map by emitting light of a specifically defined luminous intensity and a specifically defined wavelength from each of the red, blue, and green light emitters in the digital display. Most digital displays come with a factory preset definition of its "white point," which provides the definitions of luminous intensity and wavelength of light emitted from each of the red, blue, and green light emitters that are necessary to produce light having the chromaticity of its factory preset white point. As also discussed above, many digital displays, including digital displays for tablets and computing devices, are guided toward a factory preset white point having high brightness associated with a CCT above 3500K.

In an embodiment, the graphics processing unit may instruct the digital display to produce white light having a warmer or cooler chromaticity than the chromaticity of the digital display's factory preset white point by changing the specific definition of luminous intensity emitted from only the blue light emitter. In such a way, the graphics processing unit may shift the overall chromaticity of the white light emitted from the digital display such that the digital display emits white light having a warmer or cooler CCT than the factory preset. Shifting the overall chromaticity of the light to a warmer CCT may increase a user's melatonin production, triggering the user's brain to ready itself for sleep. Similarly, shifting the overall chromaticity of the light to a cooler CCT may decrease the user's melatonin production, encouraging a state of wakefulness.

In FIG. 5, each percentage value of blue light intensity in the intensity CCT correlation table 500 in an embodiment may refer to a percentage of the maximum luminous intensity the blue light emitters for the digital display are capable of providing. The correlated color temperatures (CCTs) of a white point in an embodiment may be altered by altering the blue light intensity while keeping the wavelength of the blue light emitters constant and keeping both the luminous intensities and emitted wavelengths of the red and green light emitters constant. The intensity CCT correlation table 500 shown in FIG. 5 assumes constant wavelengths of blue light emitted, and constant luminous intensities and emitted wavelengths of the red and green light emitters, and correlates shifts in values in the luminous intensity of the digital display blue light emitters (shown as percentage values of the maximum intensity) with changes in the digital display white point CCT such a shift would cause. For example, the intensity CCT correlation table 500 shown in FIG. 5 indicates that blue light emitters emitting light at a set wavelength with maximum potential luminous intensity may produce a digital display white point CCT of 4000K, which may be high (or cool) enough to inhibit a user's brain's production of melatonin. In comparison, and as another example, the intensity CCT correlation table 500 shown in FIG. 5 indicates that blue light emitters emitting light at the same set wavelength with a luminous intensity of only 70% of the maximum may produce a digital display white point CCT of only 3200K, which may be low (or warm) enough to trigger a user's brain to begin producing melatonin and ready the user for sleep.

Figure 6:
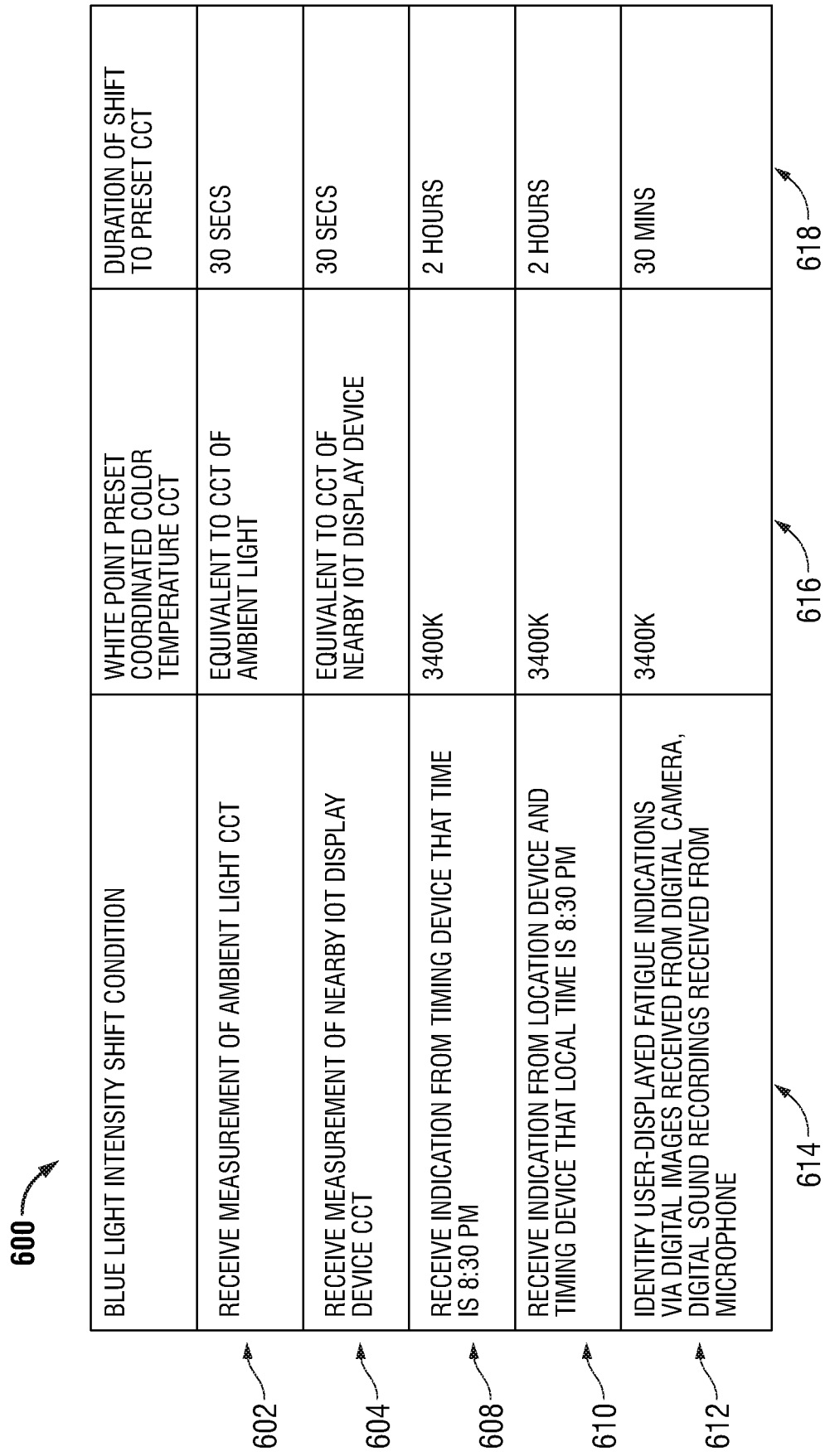
FIG. 6 is a graphical diagram illustrating a blue light intensity shift condition table according to an embodiment of the present disclosure.

FIG. 6 is a graphic diagram illustrating a blue light intensity shift condition table according to an embodiment of the present disclosure. The blue light intensity shift condition table 600, in an embodiment, may comprise rows 602-612 and columns 614-618, as shown in FIG. 6. As discussed above, the shifting condition definition module, in an embodiment, may operate to receive user input and to store the user input in an internal data record such as the blue light intensity shift condition table 600. The user input stored in the blue light intensity shift condition table 600 may include, but may not be limited to a user-defined, adjusted white point preset coordinated color temperature (shown in column 616) the user wishes the digital display to emit upon the occurrence of a preset blue light intensity shift condition (shown in column 614), and the user-defined duration of time during which the user wishes the digital display to shift to the user-defined, adjusted white point preset coordinated color temperature (shown in column 618) from any other coordinated color temperature.

As an example, and as shown in row 602, the shifting condition definition module in an embodiment may receive and record in the blue light intensity shift condition table 600 user input indicating that upon the receipt of measurement of ambient light CCT differing from the default digital display white point CCT by at least a set percentage (here 20%), the user wishes to shift the CCT of the digital display's white point to match the measured ambient light CCT. As another example, and as shown in row 604, the shifting condition definition module in an embodiment may receive and record in the blue light intensity shift condition table 600 user input indicating that upon the receipt of measurement of a nearby IOT light source white point CCT differing from the default digital display white point CCT by at least a set percentage (here 20%), the user wishes to shift the CCT of the digital display's white point to match the measured nearby IOT light source white point CCT.

As another example, and as shown in row 608, the shifting condition definition module in an embodiment may receive and record in the blue light intensity shift condition table 600 user input indicating the user wishes to shift the CCT of the digital display's white point to 3400K over a two hour period, beginning at 8:30 PM. As another example, and as shown in row 610, the shifting condition definition module in an embodiment may receive and record in the blue light intensity shift condition table 600 user input indicating the user wishes to shift the CCT of the digital display's white point to 3400K over a two hour period, beginning when the time at a specified location reaches 8:30 PM. The location may be a requirement condition as well. For example, the preset condition may be location dependent in that the information handling system must not be detected to be at a location designated as a work location. In other aspects, the detected location may be associated with a home or residential location such as a hotel before the shifting condition may be met.

In yet another example, and as shown in row 612, the shifting condition definition module in an embodiment may receive and store a detected fatigue indication within the blue light intensity shift condition table 600 user input indicating the user wishes to shift the CCT of the digital display's white point to 3400K over a thirty minute period, upon identification of user-displayed fatigue indications.

As also discussed above, the shifting condition detection module in an embodiment may operate to identify signs of increased user lethargy, to determine the coordinated color temperature of the ambient light surrounding the display device, to determine when a preset time condition occurs, to determine when a preset time condition at a specific location occurs or to receive measurements of the white point CCT of a nearby IOT light source. The shifting condition detection module in an embodiment, as also discussed above, may also operate to access the blue light intensity shift condition table 600, and associate an identified sign of increased user lethargy, a measurement of ambient light CCT, the occurrence of a preset time, the occurrence of a preset time in a specific location, or receipt of a measurement of the white point CCT of a nearby IOT light source with a blue light intensity shift condition listed in column 614 of the blue light intensity shift condition table 600.

For example, in an embodiment, the shifting con-dition detection module in an embodiment may receive a measurement of ambient light surrounding the display device, access the blue light intensity shift condition table 600, and identify, in the row 602, the measurement of the ambient light CCT differing from the default digital display white point CCT by at least a set percentage (here 20%), as a condition upon the occurrence of which the digital display should shift its white point CCT to match the CCT of the ambient light over a period of thirty seconds. As another example, the shifting condition detection module in an embodiment may receive a measurement of a nearby IOT light source white point CCT, access the blue light intensity shift condition table 600, and identify, in the row 604, the measurement of the nearby IOT light source white point CCT differing from the default digital display white point CCT by at least a set percentage (here 20%), as a condition upon the occurrence of which the digital display should shift its white point CCT to match the white point CCT of the nearby IOT light source over a period of thirty seconds.

As another example, in an embodiment, the shifting condition detection module in an embodiment may receive an indication from the timing device that the local time is 8:30 PM, access the blue light intensity shift condition table 600, and identify, in row 608, the indication from the timing device that the local time is 8:30 PM as a condition upon the occurrence of which the digital display should shift its white point CCT to 3400K over a period of two hours. As another example, in an embodiment, the shifting condition detection module in an embodiment may receive an indication from the timing device and the location device that the time in a specific location is 8:30 PM, access the blue light intensity shift condition table 600, and identify, in row 608, the indication from the timing device and the location device that the time in a specific location is 8:30 PM as a condition upon the occurrence of which the digital display should shift its white point CCT to 3400K over a period of two hours. As another example, in an embodiment, the shifting condition detection module in an embodiment may identify user-displayed fatigue indications, access the blue light intensity shift condition table 600, and identify, in row 612, the identification of user-displayed fatigue indications as a condition upon the occurrence of which the digital display should shift its white point CCT to 3400K over a period of thirty minutes.

Figure 7:
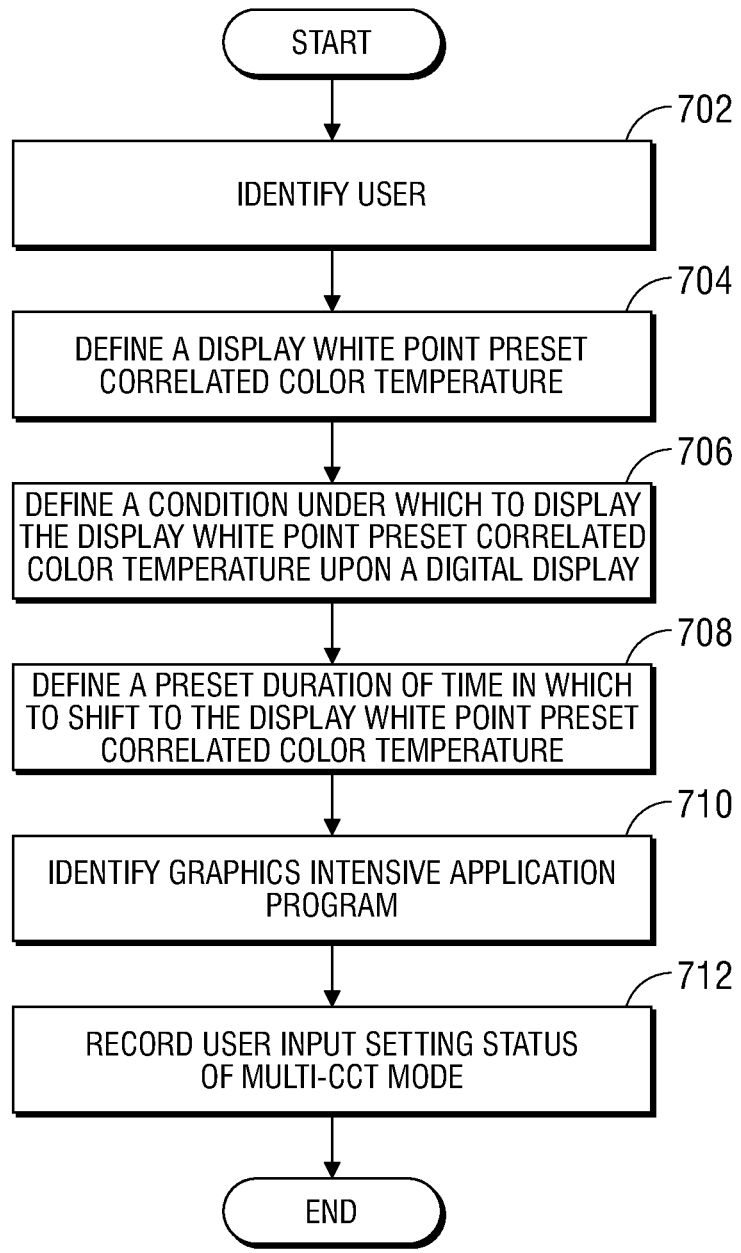
FIG. 7 is a flow diagram illustrating a method for associating a preset condition with a preset adjusted display white point correlated color temperature, and a preset period of time according to an embodiment of the present disclosure.

FIG. 7 is a flow diagram illustrating a method for recording and associating with one another a user-defined preset adjusted display white point coordinated color temperature, a preset condition, and a preset period of time according to an embodiment of the present disclosure. The method may include one or more of identifying a user, defining a display white point preset correlated color temperature, defining a condition under which to display the display white point preset correlated color temperature upon a digital display, defining a preset duration of time in which to shift to the display white point preset correlated color temperature, identifying one or more graphics intensive application programs stored in the main memory of the information handling system, and recording user input setting the status of multi-CCT mode.

At block 702, in an embodiment, the user identification module may receive information identifying a specific user in one example aspect. As discussed above, the user identification module may be operatively connected to the alphanumeric input device and may be capable of receiving user input in the form of user identifications and passwords capable of identifying a specific user. The user identification module may also be operatively connected to any other form of input device capable of communicating user identification, including, but not limited to retinal scans, fingerprint scans, facial recognition systems, voice recognition systems, and/or gesture recognition systems. By identifying each user, the contextual blue light management system may generate a blue light shift condition table for each user, such that the computing device may emit light from the digital display customized according to the individual preferences of each user.

At block 704, in an embodiment, an adjusted display white point preset correlated color temperature (CCT) may be defined. The adjusted display white point preset correlated color temperature in an embodiment may be preset at the factory, or may be preset via user input. As discussed above, the shifting condition definition module, in an embodiment, may operate to receive user input and to record the user input in an internal data record such as the blue light intensity shift condition table. As an example, in the embodiment described with reference to FIG. 6, the shifting condition definition module, in an embodiment may store a user-defined, adjusted white point preset coordinated color temperature having values between 3400K and 4000K in column 616 of the blue light intensity shift condition table 600.

At block 706, in an embodiment, a condition under which to display the user-defined, adjusted white point preset coordinated color temperature upon the digital display may be defined. The condition under which to display the user-defined, adjusted white point preset coordinated color temperature upon the digital display in an embodiment may be preset at the factory, or may be preset via user input. As discussed above, the shifting condition definition module, in an embodiment, may operate to receive user input and to record the user input in an internal data record such as the blue light intensity shift condition table. As an example, in the embodiment described with reference to FIG. 6, the shifting condition definition module, in an embodiment may store a user-defined condition under which to display the adjusted preset correlated CCT upon the digital display in column 616 of the blue light intensity shift condition table 600. Adjustment to the user-defined, adjusted white point preset coordinated color temperature for the digital display may be from a default display CCT white point of the display device set at the factory.

The shifting condition definition module, in an embodiment, may store those conditions in such a way as to associate the occurrence of each condition with the specific user-defined, adjusted white point preset coordinated color temperature the user wishes the digital display to emit upon the occurrence of that specific condition. As an example, a user may wish to user the higher (cooler) factory preset white point CCT of over 3500K during the day, when the user wishes to suppress melatonin production and remain in a wakeful state, but the user may also wish to decrease the white point CCT to a lower (warmer) user-defined, adjusted white point preset coordinated color temperature of 3400K as the user approaches bedtime, preparing for sleep. For example, in the embodiment described with reference to FIG. 6 and as shown in row 608 of the blue light intensity shift condition table 600, the shifting condition definition module may store the receipt of an indication from the timing device that the time is 8:30 PM as a blue light intensity shift condition in such a way as to associate the receipt of an indication from the timing device that the time is 8:30 PM with the user-defined, adjusted white point preset coordinated color temperature of 3400K.

As another example embodiment, a user who is travelling may wish to maintain the circadian rhythm (sleep cycle) he keeps at his home location. In such a situation, the user may wish to use the higher (cooler) factory preset white point CCT of over 3500K during the period corresponding to daytime in his home location, when the user wishes to suppress melatonin production and remain in a wakeful state. But the user may also wish to decrease the white point CCT to a lower (warmer) user-defined, adjusted white point preset coordinated color temperature of 3400K as he approaches the time period corresponding to his bedtime in his home location regardless of the time at his current location, thereby allowing him to maintain his regular home-based circadian rhythm, despite travelling to a different time zone.

As discussed above, the shifting condition detection module may operate to receive time measurements via the time detection device, and to determine when a preset time condition occurs. In one embodiment described with reference to FIG. 6 and as shown in row 610 of the blue light intensity shift condition table 600, the shifting condition definition module may record the receipt of an indication from the timing device and location device that the time at a specific location is 8:30 PM (regardless of the time at the user's current location) as a blue light intensity shift condition in such a way as to associate the receipt of an indication from the timing device and the location device that the time at the specific location is 8:30 PM with the user-defined, adjusted white point preset coordinated color temperature of 3400K. In such a way, if the specific location is the user's home location the user may trigger a white point CCT level at a level to prepare the user for sleep regardless of the time at his current location, thereby allowing the user to maintain a regular home-based circadian rhythm, despite travelling to a different time zone.

Similarly, a user may decrease the effects of jet lag prior to a travel to a distant time zone by altering his circadian rhythm, prior to his travel, to match the circadian rhythms of those living in the distant time zone. In such a situation, the user may wish to use the higher (cooler) factory preset white point CCT of over 3500 during the period corresponding to daytime in the distant time zone, when the user will wish to suppress melatonin production and remain in a wakeful state after arriving at the distant time zone. But the user may also wish to decrease the white point CCT to a lower (warmer) user-defined, adjusted white point preset coordinated color temperature of 3400K as he approaches the time period corresponding to the bedtimes of those living in the distant time zone, triggering his brain to begin the production of melatonin and ready him for sleep regardless of the time at his location prior to travel, thereby allowing him to alter his circadian rhythm, prior to travel, to match the circadian rhythms of those living the distant time zone.

In another embodiment, the shifting condition detection module may operate to receive location information via the location detection device, correct the time measurement received by the time detection device and determining when a preset time condition at that specific location occurs. In another version of the embodiment described with reference to FIG. 6 and as shown in row 610 of the blue light intensity shift condition table 600, the shifting condition definition module may store the receipt of an indication from the timing device and location device that the time at the specific location is 8:30 PM (regardless of the time at the user's home or current location) as a blue light intensity shift condition in such a way as to associate the receipt of an indication that the time at the specific location is 8:30 PM and the location is an acceptable location for a shift to the white point CCT. For example, the indicators may indicate 8:30 PM or another defined time with a location detected at a home or residential location. This combination of conditions is associated with the user-defined, adjusted white point preset coordinated color temperature of 3400K. In such a way, if the specific location is the user's home or residential location, the contextual blue light management system may adjust to the adjusted white point preset coordinated color temperature to prepare the user for sleep. It is understood that in each of the recited embodiments of FIG. 6 and elsewhere in the present disclosure, any time or location may be used as a basis for satisfying a preset condition for adjustment to the adjusted white point preset coordinated color temperature level. In other aspects, determination of a location may inhibit or restrict application of a shift to the adjusted white point preset coordinated color temperature such as if the time has reached a pre-set condition level but the location is associated with a workplace or a public location.

As another example, a user may instruct the contextual blue light management system to detect signs of user fatigue, and upon identification of those signs, to automatically lower the digital display CCT, in anticipation of readying the user for bed. Alternatively, the user may instruct the contextual blue light management system to detect signs of user fatigue, and upon identification of those signs, to automatically increase the digital display CCT, anticipating a more wakeful state. As discussed above, the shifting condition detection module within the contextual blue light management system may operate to receive digital images of the user via the digital camera and analyze the digital images of the user to identify signs of increased user lethargy, such as increases in blinking, pupil-dilation, or yawning. As also discussed above, the shifting condition detection module may operate to receive audio sound recordings of the user via the microphone, and to analyze those audio sound recordings to identify signs of increased user lethargy, including audible yawning, or increased periods of lack of activity such as typing or clicking. As also described above, the peripheral sensor/light source interface device module may communicate with an IOT external sensor capable of capturing digital images or digital audio recordings of the user that the shifting condition detection module may analyze for signs of user fatigue. The shifting condition detection module in an embodiment may achieve these analyses through use of any one of several known facial recognition methods or voice recognition methods available in the art. In the embodiment described with reference to FIG. 6 and as shown in row 612 of the blue light intensity shift condition table 600, the shifting condition definition module may record the identification of user-displayed fatigue indications via digital images received from a digital camera or digital sound recordings received from a microphone as a blue light intensity shift condition in such a way as to associate the identification of user-displayed fatigue indications with the user-defined, adjusted white point preset coordinated color temperature of 3400K. In such a way, the user may instruct the contextual blue light management system to automatically lower the digital display white point CCT upon identification of user-displayed fatigue indications, triggering readiness for bed.

As another example, a user may use the contextual blue light management system to instruct the digital display to emit light having the same white point CCT as the ambient light CCT surrounding the digital display, or to emit light having a CCT relatively higher or lower by some preset degree than the ambient light surrounding the digital display. As discussed above, the shifting condition detection module in an embodiment may operate to receive measurements of the ambient light surrounding the digital display via the ambient light detector, and to determine the coordinated color temperature of the ambient light measured. As also described above, the peripheral sensor/light source interface device module may communicate with an IOT external sensor capable of measuring ambient light surrounding the digital display, and communicate those measurements to the shifting condition detection module. In the embodiment described with reference to FIG. 6 and as shown in row 602 of the blue light intensity shift condition table 600, the shifting condition definition module may record the receipt of ambient light CCT measurement differing from the default digital display white point CCT by at least a set percentage (here 20%), as a blue light intensity shift condition in such a way as to associate the receipt of ambient light CCT measurement with the user-defined, adjusted white point preset coordinated color temperature equivalent to the measured ambient light CCT. In such a way, a user may avoid the common problem of digital displays altering user's circadian rhythms away from those individuals who abstain from viewing digital displays before or after sunset.

As another example, a user may use the contextual blue light management system to instruct the digital display to emit white light having the same CCT as a measured white point CCT of a nearby TOT light source. As described above, the peripheral sensor/light source interface device module may communicate via a network with an TOT external light source, such as a nearby LED television or a smart lighting system in which the user is viewing the digital display. Thus, the peripheral sensor/light source interface device module in an embodiment may determine, through communication with either an TOT external sensor or an TOT external light source, the white point CCT of the nearby TOT light source. In the embodiment described with reference to FIG. 6 and as shown in row 604 of the blue light intensity shift condition table 600, the shifting condition definition module may record the receipt of a CCT measurement of a nearby TOT light source differing from the default digital display white point CCT by at least a set percentage (here 20%) as a blue light intensity shift condition in such a way as to associate the receipt of a CCT measurement of a nearby TOT light source with the user-defined, adjusted white point preset coordinated color temperature equivalent to the mea-sured CCT of the nearby TOT light source. In such a way, a user may instruct the contextual blue light management system to automatically adjust the digital display white point CCT to match the white point CCT of the nearby TOT external light source, such as an LED television or smart lighting system in the same room as the user and the digital display.

In another aspect, the contextual blue light man-agement system may determine to display an adjusted white point preset coordinated color temperature level for the information handling system display due to preset condi-tions being met as described above. The contextual blue light management system may further transmit commands to a networked nearby IOT external light source, such as an LED television or smart lighting system in the same room as the user and the digital display to similarly adjust to the same or similar adjusted white point preset coordinated color temperature level where available.

At block 708, in an embodiment, a preset duration of time in which the digital display should shift to the user-defined, adjusted white point preset coordinated color temperature may be defined. The duration of time in which the digital display should shift to the user-defined, adjusted white point preset coordinated color temperature in an embodiment may be preset at the factory, or may be preset via user input. In an embodiment, a user may instruct the contextual blue light management system to shift to the preset white point CCT of the digital display over a specified duration, depending upon the blue light intensity shift condition which triggers that shift. As discussed above, the shifting condition definition module, in an embodiment, may operate to receive user input and to record the user input in an internal data record such as the blue light intensity shift condition table. As an example, in the embodiment described with reference to FIG. 6, the shifting condition definition module, may record in column 618 of the blue light intensity shift condition table 600 user-defined durations of time over which the digital display should shift to each user-defined, adjusted white point preset coordinated color temperature.

As an example, a user may instruct the contextual blue light management system to shift to the preset white point CCT of the digital display over a relatively short period of thirty seconds in certain scenarios. In the embodiment described with reference to FIG. 6, and as shown in rows 602, and 604 of the blue light intensity shift condition table 600, the shifting condition module may operate to receive and record user input indicating the shift to the preset white point CCT of the digital display associated with the receipt of an ambient light CCT measurement differing from the default digital display white point CCT by at least a set percentage (here 20%), or the receipt of a nearby IOT display device white point CCT measurement differing from the default digital display white point CCT by at least a set percentage (here 20%). In such a way, the user may instruct the contextual blue light management system in an embodiment to shift the white point CCT of the digital display quickly in order to adapt the digital display to its surrounding environment quickly.

As another example embodiment, the contextual blue light management system may shift to the preset adjusted white point CCT of the digital display gradually. For example, a gradual shift may occur over a relatively lengthy period of two hours in certain scenarios. In other aspects, the gradual shift may occur over a period of minutes such as 10 minutes, 30 minutes, or any extended period. The shift may be gradual to reduce the user's perception that the shift is taking place an may improve the user experience. In the embodiment described with reference to FIG. 6, and as shown in rows 608 and 610 of the blue light intensity shift condition table 600, the shifting condition module may operate to receive and record user input indicating the shift to the preset white point CCT of the digital display associated with receipt of an indication from a timing device that the local time is 8:30 PM, and/or the receipt of an indication from the location device and the timing device that the time at a specific location is 8:30 PM should occur over a two hour duration. In such a way, the user may instruct the contextual blue light management system to automatically alter the white point CCT of the digital display to shift slowly thereby gently readying the user for sleep over the two hour period. It is understood that any preset time duration may be used for a gradual shift from 5-10 seconds up to several hours. The longer and more gradual the shift, the less likely the user will notice the change however the shift to a final adjusted white point preset coordinated color temperature level will be delayed as the gradual shift occurs.

At block 710, in an embodiment, one or more graphics intensive application programs stored in main memory may be identified. As discussed above, altering the white point CCT of a digital display operating graphics intensive application programs may be suboptimal. In such a scenario, a user may preset the contextual blue light management system to avoid decreasing the white point CCT of either the entire digital display, or just the portion of the digital display upon which the graphics intensive application program is being displayed, despite the occurrence of another blue light intensity shift condition under which the digital display should emit a decreased white point CCT. A user may wish the white point CCT of the digital display to remain above 3500K during the operation of graphics intensive application programs such as a photo display application or a visual reality application, despite the occurrence of one of the above defined blue light intensity shift conditions. Program applications available for use on the information handling system display may have varied levels of tolerance to the adjusted white point preset coordinated color temperature level that may impact the user experience with those software program applications. In an embodiment, the user may identify for the processor one or more graphics intensive application program instructions stored in memory for which the user wishes the white point CCT to remain above 3500K. Further, the user may define a variety of adjusted white point preset coordinated color temperature levels for various program operations depending on the amount of shift tolerable for those programs. In such a way, the user may instruct the contextual blue light management system to effectively "override" instructions to emit a warmer or lower white point CCT when the user is viewing these specifically identified graphics intensive programs. In such an aspect, the user may override or impede the shift to an adjusted white point preset coordinated color temperature level in whole or just partially for designated program applications. In an example embodiment, this may be assigned as a graphics intensity designation for the program applications. In yet other embodiments, preset conditions may differ for the shift of the display device light levels to adjusted white point preset coordinated color temperature level. For example, lower graphics intensive applications may shift at an earlier time whereas higher graphics intensive programs may shift at a later time or only at a location with a specific designation. Other example embodiments may require differing preset blue light shift conditions to trigger shifts to adjusted white point preset coordinated color temperature levels for application programs with differing graphic intensity designations.

At block 712, in an embodiment, the condition definition module may receive and record user input setting the status of multi-CCT mode. As discussed above with reference to block 710, altering the white point CCT of a digital display operating graphics intensive application programs may be suboptimal. When the information handling system is operating graphics intensive application programs upon the occurrence of a defined condition, also referred to as a blue light shift condition, the contextual blue light management system may override instructions to emit a warmer or lower white point CCT for any portion of the digital display. Another option er is to place the contextual blue light management system in multi-CCT mode, thereby instructing the contextual blue light management system to shift the white point CCT of the portion of the display not dedicated to displaying the graphics intensive application to a warmer or cooler CCT, while allowing the portion of the display that is dedicated to displaying the graphics intensive application to remain at the default white point CCT. Designation of a display output from a lower, graphics intensive application may be determined for a subset of pixels of the display device in one aspect. For example, a subset of pixels associated with a window or graphical user interface for a lower, graphics intensive application program may be designated on the display device to allow a blue light shift to a warmer CCT. In another aspect, a different subset of display pixels for a graphical output for a higher graphics intensity level application program may be designated. In an example embodiment, the subset of pixels associated with the higher graphics intensity level application program may be impeded or restricted from adjusting, in whole or partially, to the warmer CCT. In some aspects, a different set of blue light shift conditions may be met to cause the higher graphics intensive application program subset of pixels to shift to a warmer CCT level such as receipt of an indication of fatigue, a later time, or a new location associated with a residence.

Figure 8:
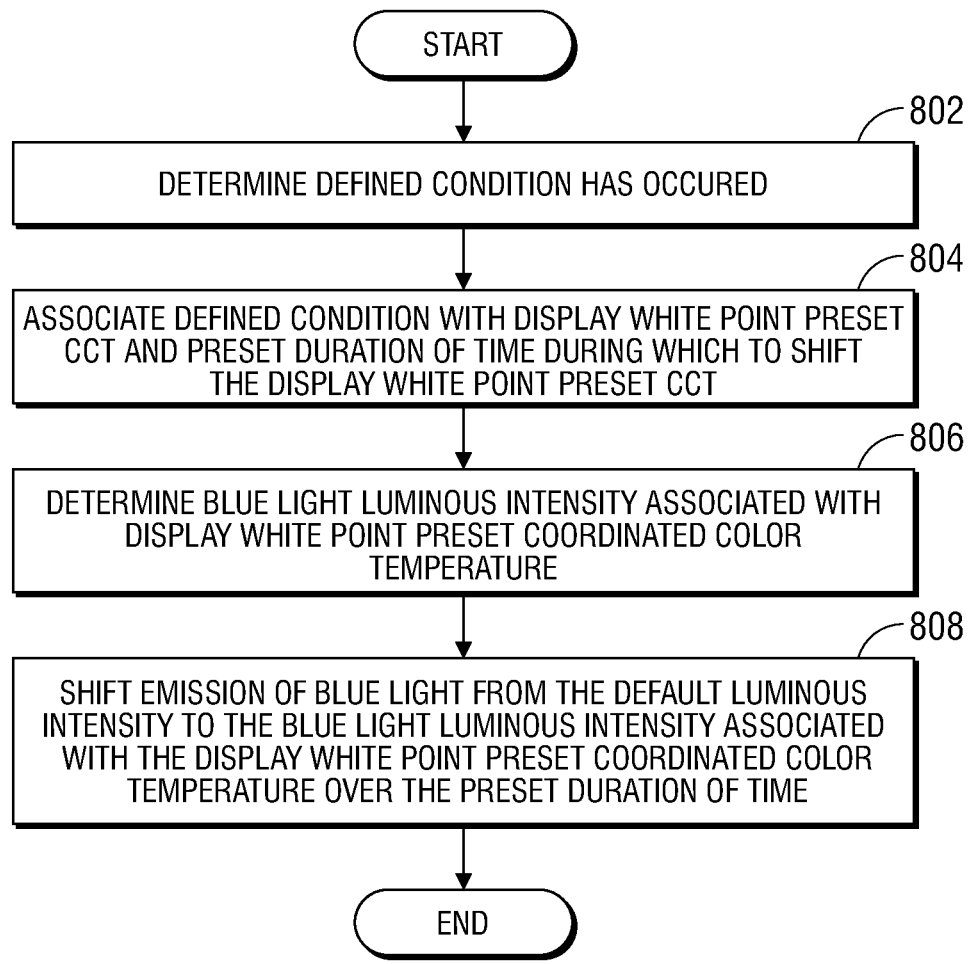
FIG. 8 is a flow diagram illustrating a method of shifting a digital display white point coordinated color temperature over a preset duration of time according to an embodiment of the present disclosure.

FIG. 8 is a flow diagram illustrating a method of shifting a digital display white point coordinated color temperature over a preset duration of time according to an embodiment of the present disclosure. The method may include one or more of determining a defined condition has occurred, associating the defined condition with an adjusted display white point preset CCT and a preset duration of time during which to shift to the adjusted display white point preset CCT, determining the blue light luminous intensity associated with the display white point preset coordinated color temperature, and shifting the emission of blue light from the default luminous intensity to the blue light luminous intensity associated with the adjusted display white point preset coordinated color temperature over the preset duration of time.

At block 802, in an embodiment, the shifting condition detection module may determine a predefined condition has occurred. As discussed above, the shifting condition detection module in an embodiment may operate to perform actions including, but not limited to: (1) receiving and analyzing digital images of the user via the digital camera to identify signs of increased user lethargy, such as increases in blinking, pupil-dilation, or yawning; (2) receiving and analyzing audio sound recordings of the user via the microphone to identify signs of increased user lethargy, including audible yawning; (3) receiving measurements of the ambient light surrounding the digital display via the ambient light detector, and to determine the coordinated color temperature of the ambient light measured; (4) receiving the time at a location such as a home time zone or a current time zone, and to determine when a preset time condition occurs; and/or (5) receiving location information via the location detection device. The time received may be compensated for by considering the time zone in which the identified location lies in some embodiments as describe above when determining when a preset time condition at that location occurs.

As also discussed above, in an embodiment, the shifting condition detection module in an embodiment may operate to access the blue light intensity shift condition table described, for example such as that in FIG. 6, associate a received reading, measurement, time, location, or result of analysis of a digital image or audio recording with a user-defined preset blue light-shifting condition. The contextual blue light management system may communicate the occurrence of that particular condition to the light intensity shifting module. For example, with reference to the embodiment described herein, such as shown in the column 614 of the blue light intensity shift condition table 600 of FIG. 6, the shifting condition detection module may determine that any of the pre-set blue light intensity shift conditions listed in column 614 has occurred. The blue light intensity shift conditions such as described in the present disclosure may be satisfied individually or in any combination as understood by those of skill and may include: receipt of an ambient light CCT measurement; receipt of a nearby IOT light source white point CCT measurement; receipt of data indicating the local time; receipt from a location device the location of the information handling system and may further include the time zone; and/or identification of user-displayed fatigue indications. Upon the shifting condition detection module's association of a reading, measurement, result of analysis of a digital image or audio recording, or occurrence of a particular event with a preset blue light intensity shift condition within the blue light intensity shift condition table, the shifting condition detection module in an embodiment, may communicate the occurrence of that blue light intensity shift condition to the light intensity shifting module. In such a way, the contextual blue light management system may determine that one or more of the defined conditions, listed as a blue light shift condition, has occurred and been satisfied to trigger a shift to an adjusted display white point preset CCT instantaneously or over a preset duration of time to provide for a gradual shift.

At block 804, in an embodiment, the defined condition may be associated with an adjusted display white point preset CCT and a preset duration of time during which to shift the display white point preset CCT. As discussed above, upon the shifting condition detection module's association of a reading, measurement, indicator, location, result of analysis of a digital image or audio recording, or occurrence of a particular event associated with a preset blue light intensity shift condition within the blue light intensity shift condition table, the shifting condition detection module in an embodiment, may determine a specific blue light shift should occur. In an example embodiment, the occurrence of a blue light shift condition may be communicated to the light intensity shifting module. The light intensity shifting module in an embodiment may then associate the occurrence of that event with a specific user-defined, adjusted white point preset coordinated color temperature, and associated the shift with a specific duration of time over which to shift to the user-defined, adjusted white point preset coordinated color temperature. As an example, in the embodiment described with reference to FIG. 6, the shifting condition detection module may associate the receipt of a measurement of the ambient light CCT differing from the default digital display white point CCT by at least a set percentage (here 20%) with the blue light intensity shift condition listed in row 602 of the blue light intensity shift condition table 600, and communicate the occurrence of that blue light intensity shift condition to the light intensity shifting module. The light intensity shifting module in that embodiment may then associate the occurrence of that condition with the user-defined, adjusted white point preset coordinated color temperature equivalent to the measured ambient light CCT and the preset shift duration of thirty seconds.

As another example, in the embodiment described with reference to FIG. 6, the shifting condition detection module may associate the receipt of a measurement of a nearby IOT light source white point CCT differing from the default digital display white point CCT by at least a set percentage (here 20%) with the blue light intensity shift condition listed in row 604 of the blue light intensity shift condition table 600, and communicate the occurrence of that blue light intensity shift condition to the light intensity shifting module. The light intensity shifting module in that embodiment may then associate the occurrence of that condition with the user-defined, adjusted white point preset coordinated color temperature equivalent to the measured nearby IOT light source white point CCT and the preset shift duration of thirty seconds.

As another example, in the embodiment described with reference to FIG. 6, the shifting condition detection module may associate the receipt of an indication from the timing device of the time, for example that the time is 8:30 PM or some other set time for shift with the blue light intensity shift condition, and communicate the occurrence of that blue light intensity shift condition to the light intensity shifting module. The light intensity shifting module in that embodiment may then associate the occurrence of that condition with the user-defined, adjusted white point preset coordinated color temperature of 3400K and the preset shift duration of two hours.

As another example, in an embodiment such as described with reference to FIG. 6, the shifting condition detection module may associate the receipt of an indication from the timing device of the time at a specified location such as 8:30 PM at a residence location or in an identified time zone with the blue light intensity shift condition listed in row 610 of the blue light intensity shift condition table 600, and communicate the occurrence of that blue light intensity shift condition to the light intensity shifting module. The light intensity shifting module in that embodiment may then associate the occurrence of that condition with the user-defined, adjusted white point preset coordinated color temperature of 3400K and the preset shift duration of two hours.

As yet another example embodiment the shifting condition detection module may associate the identification of user-displayed fatigue indications with the blue light intensity shift condition such as listed in row 612 of the blue light intensity shift condition table 600 of FIG. 6, and communicate the occurrence of that blue light intensity shift condition to the light intensity shifting module. The light intensity shifting module in that embodiment may then associate the occurrence of that condition with the user-defined, adjusted white point preset coordinated color temperature of 3400K and the preset shift duration of thirty minutes.

At block 806, in an embodiment, a blue light intensity associated with the adjusted display white point preset CCT may be determined. The light intensity shifting module in an embodiment may also access the intensity CCT correlation table to identify the user-defined, adjusted white point preset coordinated color temperature with the corresponding blue light luminous intensity the digital display would need to emit in order to achieve the user-defined, adjusted white point preset coordinated color temperature. For example, in the embodiment described with reference to FIG. 5, the light intensity shifting module in an embodiment may access the CCT correlation table 500 to determine the digital display must emit a luminous intensity from its blue light emitters equivalent to 100% of the maximum intensity the blue light emitters are capable of emitting in order for the digital display to have a white point CCT of 4000K, equivalent to 90% of the maximum intensity the blue light emitters are capable of emitting in order for the digital display to have a white point CCT of 3900K, equivalent to 85% of the maximum intensity the blue light emitters are capable of emitting in order for the digital display to have a white point CCT of 3800K, equivalent to 80% of the maximum intensity the blue light emitters are capable of emitting in order for the digital display to have a white point CCT of 3700K, equivalent to 75% of the maximum intensity the blue light emitters are capable of emitting in order for the digital display to have a white point CCT of 3400K, equivalent to 70% of the maximum intensity the blue light emitters are capable of emitting in order for the digital display to have a white point CCT of 3200K. It is understood that other correlations between percentage of maximum intensity of blue light emitters and white point CCT levels may be used depending on the display system or reference points to be used.

At block 808, in an embodiment, the emission of blue light may gradually shift from the default luminous intensity to the blue light luminous intensity associated with the display white point preset coordinated color temperature over the preset duration of time. The light intensity shifting module in an embodiment may instruct the digital display to gradually change the luminous intensity of the light emitted from the blue light emitters in the digital display, in a given progression, to the identified luminous intensity for achieving the target adjusted white point preset coordinated color temperature, over the preset shift time duration. The light intensity shifting module in an embodiment may instruct the digital display to perform operations by communicating machine readable, executable code instructions to the graphics processing unit, which may control the display characteristics of the digital display. For example, in an embodiment where the light intensity shifting module receives a measurement of ambient light CCT equivalent to 3900K, the light intensity shifting module may communicate machine readable, executable code instructions to the graphics processing unit to gradually change the luminous intensity of the light emitted from the blue light emitters in the digital display to a luminous intensity equivalent to 90% of the maximum intensity the blue light emitters are capable of emitting over a period of thirty seconds, which will achieve a display white point CCT of 3900K. As another example, in an embodiment where the light intensity shifting module receives a measurement of a nearby IOT external light source CCT equivalent to 3800K, the light intensity shifting module may communicate machine readable, executable code instructions to the graphics processing unit to gradually change the luminous intensity of the light emitted from the blue light emitters in the digital display to a luminous intensity equivalent to 85% of the maximum intensity the blue light emitters are capable of emitting over a period of thirty seconds, which will achieve a display white point CCT of 3800K.

As another example, in an embodiment where the light intensity shifting module receives an indication of time, such as that the time is 8:30 PM or another trigger time, the light intensity shifting module may communicate machine readable, executable code instructions to the graphics processing unit to gradually change the luminous intensity of the light emitted from the blue light emitters in the digital display to a luminous intensity equivalent to 75% of the maximum intensity the blue light emitters are capable of emitting over a period of two hours, which will achieve a display white point CCT of 3400K. As another example, in an embodiment where the light intensity shifting module receives an indication from the timing device that the time at a specific location is 8:30 PM or another target trigger time, the light intensity shifting module may communicate machine readable, executable code instructions to the graphics processing unit to gradually change the luminous intensity of the light emitted from the blue light emitters in the digital display to a luminous intensity equivalent to 75% of the maximum intensity the blue light emitters are capable of emitting over a period of two hours, which will achieve a display white point CCT of 3400K. As yet another example, in an embodiment where the light intensity shifting module receives an indication from the shift condition detection module that user-displayed fatigue indications have been identified, the light intensity shifting module may communicate machine readable, executable code instructions to the graphics processing unit to gradually change the luminous intensity of the light emitted from the blue light emitters in the digital display to a luminous intensity equivalent to 75% of the maximum intensity the blue light emitters are capable of emitting over a period of thirty minutes, which will achieve a display white point CCT of 3400K.

In an embodiment, the light intensity shifting module may instruct the graphics processing unit to gradually change the luminous intensity of the light emitted from the blue light emitters in the digital display following a given progression over the preset duration of time. As described, a gradual shift may occur over a variety of set time durations. Further, in an aspect the gradual shift may follow progressions including but not limited to a linear progression over time, a curvilinear progression over time, and/or a stepped progression over time. As an example embodiment, the gradual shift may progress linearly over time, whereby the digital display shifts its white point steadily over the preset duration of time until it reaches a target adjusted white point preset coordinated color temperature at the end of the duration. As another example, the gradual shift may progress exponentially over the preset duration of time, whereby the shift in the white point begins slowly, and increases in speed over the preset duration of time. Thus toward the end of the gradual shift the change becomes more noticeable as an indicator to the user of the lateness of the hour in an example embodiment. In a different embodiment, the gradual shift may progress exponentially at first and slow over the preset duration of time, whereby the shift in the white point begins quickly, and decreases in speed over the preset duration of time. This may serve as an indicator to the user of the lateness and beginning of the gradual shift and then the shift may become less perceptible to avoid interrupting the user experience during the remaining shift time duration. As yet another example, the gradual shift may progress in steps over the preset duration of time, whereby the shift occurs at intervals that may be equal, or in unequal intervals or in bursts, each interval or burst occurring at a certain time during the course of the preset duration of time. With a stepped gradual shift over time, the need for continual processing to effect a gradual change is relieved and replaced with a series of shift steps that gradually reach the target adjusted white point preset coordinated color temperature at the end of the duration. As another aspect, each burst may occur at a certain time whereby the certain time interval is dictated by the occurrence of a second defined condition such as the blue light intensity shift conditions described in embodiments herein.

In some embodiments, the shift of emission of blue light from a default luminous intensity level for one or more digital displays may be impeded based on a detection of a limitation on executing the shift by the contextual blue light management system at 808. For example, as described further in embodiments herein, the contextual blue light management system may determine that a graphics intensive application program is operating on the information handling system. As a result of determining that a graphics intensive application program is operating such that a shift in blue light emission from default luminous intensity is not desired or acceptable, the contextual blue light management system will impede such a shift. In another example embodiment, a determination of information handling system orientation or the orientation of one or more digital display screens may impede execution of the blue light luminous intensity shift by the contextual blue light management system. For example, data from one or more orientation sensors may indicate an orientation of the information handling system in space or orientation of one or more display screens with respect to one another or a laptop keyboard to include an indication of one or several orientations. If an orientation suggests an active working usage of the information handlings system, the shift may be impeded. For example, in one set of embodiments, a tabletop orientation or desktop orientation may indicate a user is actively working such that a blue light shift may be unwelcome by the contextual blue light management system and such a shift is impeded at 808. In another set of embodiments, a book or tablet orientation may be detected which may indicate a more casual usage of the information handling system such that initiation of a contextual blue light management system is more acceptable and not impeded. It is understood that orientation detection may be set or customized by a user with respect to initiation of a shift at 808 based on a variety of detected orientations for a tablet information handling system, a mobile information handling system having two digital displays or a single, foldable digital display across two display housings, a laptop information handling system, or other mobile information handling system.

Figure 9:
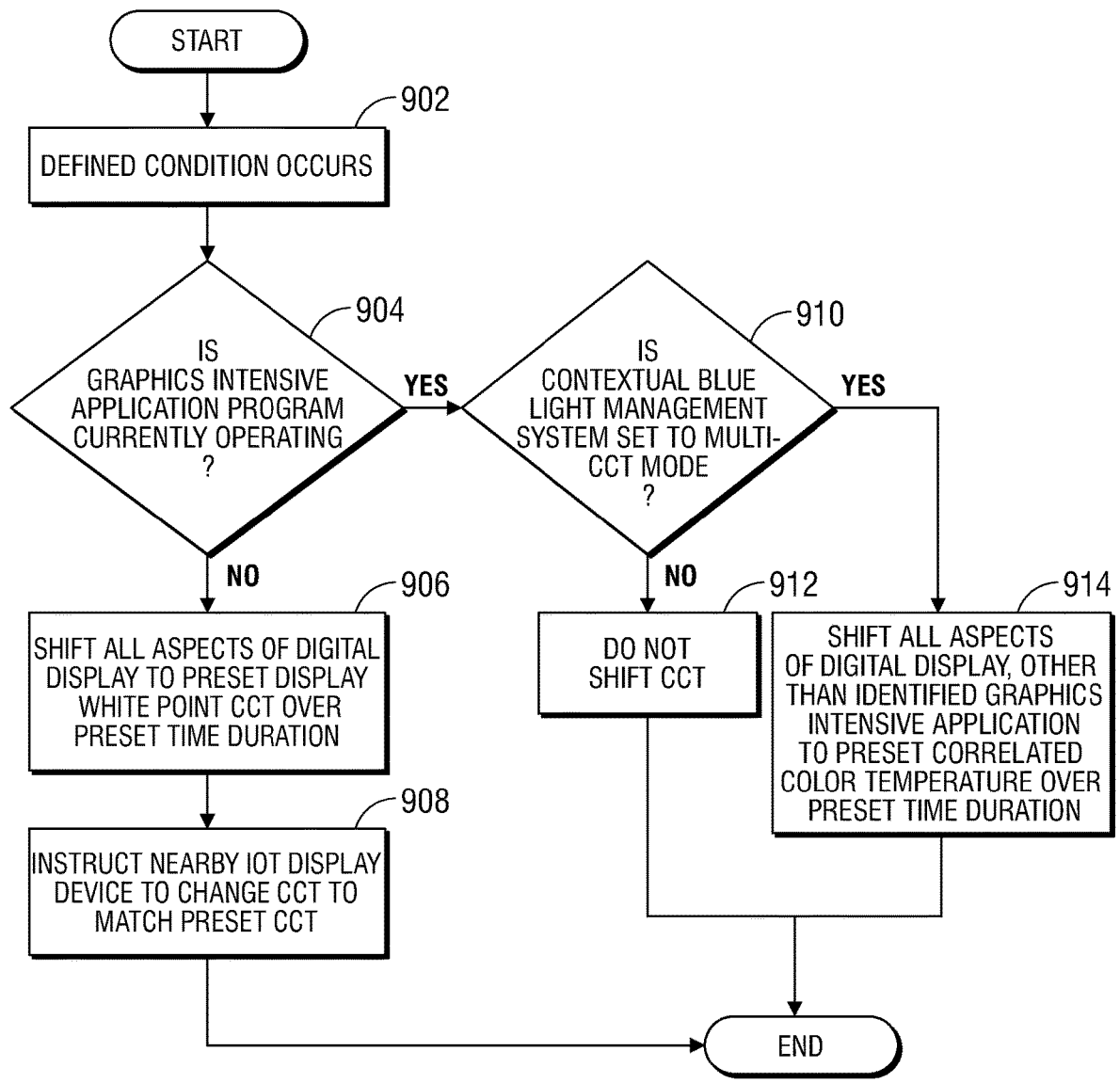
FIG. 9 is a flow diagram illustrating a method of coordinating luminous intensity for a plurality of subsets of blue light emitters within a digital display, dependent upon association between each of the plurality of subsets and one or more operating application programs according to an embodiment of the present disclosure.

FIG. 9 is a flow diagram illustrating a method of coordinating luminous intensity for a plurality of subsets of blue light emitters within a digital display, dependent upon association between each of the plurality of subsets and one or more operating application programs according to an embodiment of the present disclosure. The method may occur via execution of a set of program instructions of a contextual blue light management system by a processor, graphic processor, designated controller, ASIC, or display subsystem. The method may include one or more of the occurrence of a defined condition, and determination of whether the identified graphics intensive application program is currently operating. If the identified graphics intensive application program is not currently operating, the method may further include one or more of shifting all aspects of the digital display to the adjusted display white point preset correlated color temperature over the preset time duration, and instructing a nearby external light source to change its CCT to match the preset adjusted display white point CCT. If the graphics intensive application program is currently operating, the method may further include determining whether the contextual blue light management system is set to multi-CCT mode. If the contextual blue light management system it is set to multi-CCT mode, the method may further include shifting all aspects of the digital display, other than a subset of display pixels associated with the identified graphics intensive application, to the preset adjusted display white point CCT over the preset time duration. If the contextual blue light management system is not set to multi-CCT mode, the method may further include maintaining the display default white point CCT, across the entire display device.

At block 902, in an embodiment, a defined condition may occur. As discussed above, the shifting condition detection module of the contextual blue light management system in an embodiment may operate to perform actions including, but not limited to: (1) receiving and analyzing digital images of the user via the digital camera to identify signs of increased user lethargy, such as increases in blinking, pupil-dilation, or yawning; (2) receiving and analyzing audio sound recordings of the user via the microphone to identify signs of increased user lethargy, including audible yawning; (3) receiving measurements of the ambient light surrounding the digital display via the ambient light detector, and to determine the coordinated color temperature of the ambient light measured; (4) receiving the time via the clock or other time detection device, and to determine when a preset time condition occurs; and/or (5) receiving location information via the location detection device. Location may be a preset condition or may be used for correcting the time measurement received by the time detection device by compensating for the time zone in which the identified location lies, and determining when a preset time condition at that location occurs such as for adjusting for time zone location changes.

As also discussed above, in an embodiment, the shifting condition detection module of the contextual blue light management system may operate to access a blue light intensity shift condition table. One example of a blue light intensity shift condition table is described with reference to FIG. 6 and in other embodiments herein. The contextual blue light management system may associate a reading, measurement, or result of analysis of a digital image or audio recording with a user-defined preset blue light-shifting condition. Then the contextual blue light management system may convey that the preset blue light shift condition has occurred to the light intensity shifting module and other portions of the contextual blue light management system for further processing in achieving whether to trigger a shift to a preset adjusted white point CCT value. As described throughout the present disclosure, several preset conditions for blue light intensity shift may be determined to have occurred such as those shown in FIG. 6 or described in various embodiments herein. The preset conditions may include determination of a time, location, fatigue indicator of a user, ambient light levels, and determination of operating graphical usage intensity levels of operating application programs to name a few factors that may be assessed to satisfy or limit one or more preset blue light intensity shift conditions. Upon the shifting condition detection module's association of the occurrence of a particular event that satisfies a preset blue light intensity shift condition within the blue light intensity shift condition table, the shifting condition detection module may then determine what shift of blue light intensity to execute, what limitations may be applied, and a preset time duration over which to conduct the blue light intensity shift. In an embodiment, the contextual blue light management system may communicate the occurrence of that blue light intensity shift condition to the light intensity shifting module indicating that one or more of the defined conditions listed as a blue light shift condition has occurred.

At block 904, in an embodiment, the shifting condition detection module may determine whether a graphics intensive application program is currently operating. As discussed above, in an embodiment, one or more graphics intensive application programs stored in main memory may be identified. An application program may also be identified or designated as graphics intensive by the processor if the application program has a graphics intensity level above a preset graphics intensity level cutoff designation. As described above, whether a type of application program has a graphics intensity level designation may be customized by a user depending on tolerance of a blue light shift when using those particular applications or may be designated by the contextual blue light management system depending on a determination of the type of application program identified. For example, the contextual blue light management system may determine that certain application programs such as text editors and textual communication programs such as email or SMS text programs may tolerate greater changes in blue light intensity shifts than photo or video editing programs, video streaming programs, or graphical drawing programs. The latter would have a higher graphics intensity level than the former in an example embodiment. It is understood that a wide variety of application programs may be classified under various determinations of graphical intensity levels and some or all of those designations may be customized in the contextual blue light management system. For example, some users may tolerate blue light intensity shifts in a web browser application program while other users may not. Such a program may be customized or a setting prompt presented to the user by the contextual blue light management system.

A preset graphics intensity level may be defined based upon the graphics specification requirements needed to operate the application program, including but not limited to processing speed, available RAM, available hard disk space, and/or type of video card in other example embodiments. For example, the processor may identify all application programs requiring at least a 3 GHz processor, at least 2 GB of RAM, and at least 12 GB of available hard disk space as a graphics intensive application program. This is only one example of a combination of graphics specification requirements that may result in identification of an application program as "graphics intensive" and is not meant as a limiting example.

As also discussed above, altering the white point CCT of a digital display operating graphics intensive application programs may be suboptimal. In such a scenario, a user may preset the contextual blue light management system to avoid decreasing the white point CCT of either the entire digital display, or just the portion of the digital display upon which the graphics intensive application program is being displayed, despite the occurrence of a blue light intensity shift condition. A user may wish the white point CCT of the digital display to remain above 3500K during the operation of graphics intensive application programs such as a photo display application or a visual reality application, despite the occurrence of one of the above defined blue light intensity shift conditions. In an embodiment, the user may identify for the processor one or more graphics intensive application program instructions stored in memory for which the user wishes the white point CCT to remain above 3500K. In such a way, the user may instruct the contextual blue light management system to effectively "override" instructions to emit a warmer or lower white point CCT when the user is viewing these specifically identified graphics intensive programs.

Upon the occurrence of a defined condition, the shift condition detection module may query the processor to determine whether any of the one or more graphics intensive application program instructions stored in memory for which the user wishes the white point CCT to remain above 3500K are currently in operation. The processor may respond by returning to the shift condition detection module a list of the one or more graphics intensive application program instructions stored in memory for which the user wishes the white point CCT to remain above 3500K that are currently in operation. If the shift condition detection module determines none of the one or more graphics intensive application program instructions stored in memory for which the user wishes the white point CCT to remain above 3500K are currently in operation, the method may proceed to block 906.

At block 906, in an embodiment, the light intensity shifting module may shift all aspects of the digital display to the preset adjusted display white point CCT over the preset duration of time. As discussed above, upon the occurrence of a preset defined condition, the shifting condition detection module may communicate the occurrence of the defined condition to the light intensity shifting module, which may associate the defined condition with a target adjusted display white point preset CCT and a preset duration of time during which to shift the display white point CCT. The light intensity shifting module in an embodiment may also communicate to the peripheral sensor/light source interface device module that a defined condition has occurred, and communicate the user-defined, adjusted white point preset coordinated color temperature associated with that defined condition and the preset duration of make the shift.

For example, in an embodiment, upon the receipt of an indication that a particular time has been reached such as in FIG. 6 that the time is 8:30 PM or another trigger time, the shifting condition detection module may communicate the occurrence of that blue light intensity shift condition to the light intensity shifting module. The light intensity shifting module in such an embodiment may refer to the blue light intensity shift condition table to associate blue light intensity shift condition that is satisfied with a target adjusted display white point preset CCT level, such as 3400K, over a time duration, such as a period of 15-30 seconds, several minutes, or hours.

The light intensity shifting module may then determine the blue light luminous intensity associated with the display white point preset coordinated color temperature. For example, with reference to the embodiment described in FIG. 5, the light intensity shifting module may access the blue light luminous intensity table 500 to determine a blue light luminous intensity of 75% of the maximum luminous intensity the blue light emitters are capable of achieving is associated with the adjusted display white point preset CCT of 3400K.

The light intensity shifting module may finally communicate instructions to the GPU directing the blue light emitters to shift the luminous intensity from the default luminous intensity to the blue light luminous intensity associated with the display white point preset coordinated color temperature over the preset duration of time. For example, in an embodiment, the light intensity shifting module may communicate instructions to the GPU directing the blue light emitters to shift their luminous intensities from the default luminous intensity to 75% of the maximum luminous intensity the blue light emitters are capable of achieving over a period of two hours.

At block 908, in an embodiment, machine readable, executable code instructions may be communicated to a nearby IOT external light source, instructing it to display a white point CCT equivalent to the user-defined, adjusted white point preset coordinated color temperature over the preset duration of shift where available such as with a smart LCD television or smart home or office lighting system. In an embodiment, and as discussed above, the peripheral sensor/light source interface device module may communicate with an IOT external light source such as a nearby television digital display, or a smart lighting system for the room in which the digital display is located, via the network interface device and a network. As also discussed above, with reference to block 906, the light intensity shifting module may communicate to the peripheral sensor/light source interface device module that a defined condition has occurred, and communicate the target user-defined, adjusted white point preset coordinated color temperature and preset duration of shift to the user-defined, adjusted white point preset coordinated color temperature associated with that defined condition. The IOT external light source may also conduct a gradual blue light shift similar to those described herein.

The peripheral sensor/light source interface device module in an embodiment may then communicate machine readable executable code instructions to a nearby IOT external light source to shift the CCT of its displayed white point to the user-defined, adjusted white point preset coordinated color temperature over the preset duration of shift. For example, in the embodiment described above with respect to block 906, the light intensity shifting module may associate the occurrence of receipt of an indication that the time is 8:30 PM with the user-defined, adjusted white point preset coordinated color temperature of 3400K and the preset shift duration of two hours, and communicate this association to the peripheral sensor/light source interface device. As a further aspect of such an embodiment, the peripheral sensor/light source interface device module may communicate to a nearby external IOT light source, such as a nearby television digital display, or a smart lighting system, a machine readable, executable code instruction to shift the CCT of the IOT device's displayed white point to 3400K over a period of two hours. In such a way, the contextual blue light management system may automatically coordinate the white point CCTs of the digital display and a nearby IOT external light source such that all IOT external light sources operating in the near vicinity of the digital display and connected to the digital display via the network may display the same white point CCT. Such a scenario may ensure the information handling system environment has less conflicting lighting information, and all devices operating nearby the user may simultaneously increase or decrease blue light intensity, thus bringing the user to a more wakened state, or readying the user for sleep, respectively.

At block 910, in an embodiment, the light-shifting module may determine whether the contextual blue light management system is set to multi-CCT mode. As discussed above, altering the white point CCT of a digital display operating graphics intensive application programs may be suboptimal or undesirable for the user experience. Users operating graphics intensive application programs upon the occurrence of a defined condition may choose to override instructions to shift the blue light intensity levels to emit a warmer or lower white point CCT for any portion of the digital display. In such an instance where no multi-CCT mode is active, flow may proceed to 912 where blue light intensity shift is impeded, or partially limited as with some embodiments, for the entire digital display device while the one or more graphics intensive programs are operating. In such a way, the contextual blue light management system may avoid the problems associated with altering the white point CCT of a digital display operating graphics intensive application programs by maintaining the default digital display white point CCT. Later however, upon reaching another preset blue light intensity shift condition, the blue light intensity shift may then occur despite operation of the graphics intensive application program. For example, a later time may be reached or a home or residential location may be reached by the information handling system. As with any aspect of the contextual blue light management system may be manually overridden or limited by a user if the changes are not desired with any embodiment disclosed herein.

Another option is for the contextual blue light management system to operate in multi-CCT mode, thereby instructing the contextual blue light management system to shift the white point CCT of the portion of the display not dedicated to displaying the graphics intensive application to a warmer or cooler CCT, while allowing the portion of the display that is dedicated to displaying the graphics intensive application at the default CCT. The digital display device may allocate subsets of pixel areas with graphical outputs for operating application programs and apportion whether blue light intensity shifts of those pixel subsets will occur depending on whether a graphics intensive program is operating on those pixels. Upon the determination that a graphics intensive application is currently operating, and the determination that a defined condition has occurred, the light-shifting module may determine whether the contextual blue light management system is set to multi-CCT mode. If the contextual blue light management system is set to multi-CCT mode, the method may progress to block 914.

At block 914, in an embodiment, the light-shifting module may shift all aspects of the digital display, other than the portion of the display associated with the identified graphics intensive application, to the adjusted display white point preset CCT, over the preset time duration. The portion of the display may be a determined set of pixels associated with the display output, such as a window or GUI, for the identified graphics intensive application or applications operating on the information handling system. In an embodiment, the digital display may comprise a plurality of subsets of blue light emitters associated with the identified pixel subsets of the differing portions of the digital display. In addition, a plurality of operating application programs may be displayed, each in a different portion of the digital display. In such a way, certain subsets of blue light emitters may be associated with the display of certain operating application programs. The GPU in an embodiment may control which subsets of blue light emitters are associated with each operating application program. For example, the GPU in an embodiment may assign a first subset of blue light emitters to display an operating application program that is not defined as graphics intensive, and may assign a second subset of blue light emitters to display an operating application program that is defined as graphics intensive.

In an embodiment, the light shifting module may communicate machine readable, executable code instructions to the GPU directing the first subset of blue light emitters to shift the white point CCT of the portion of the digital display associated with the operating application program that is not graphics intensive from the default white point CCT to the target adjusted display white point preset CCT. As discussed above, upon the occurrence of a defined condition, the shifting condition detection module may communicate the occurrence of the defined condition to the light intensity shifting module, which may associate the defined condition with an adjusted display white point preset CCT and a preset duration of time during which to shift the adjusted display white point preset CCT. For example, in the embodiment described with reference to FIG. 6, upon the receipt of an indication from a timing device that the time is 8:30 PM or other trigger time, the shifting condition detection module may communicate the occurrence of that condition, which is defined in the blue light intensity shift condition table 600 in row 608 to the light intensity shifting module. The light intensity shifting module in such an embodiment may refer to the blue light intensity shift condition table 600 to associate the receipt of an indication from a timing device that the time is 8:30 PM with an adjusted display white point preset CCT of 3400K and a time duration of two hours.

The light intensity shifting module in an embodiment may then determine the blue light luminous intensity associated with the display white point preset coordinated color temperature. For example, with reference to the embodiment described in FIG. 5, the light intensity shifting module may access the blue light luminous intensity table 500 to determine a blue light luminous intensity of 75% of the maximum luminous intensity the blue light emitters are capable of achieving is associated with the adjusted display white point preset CCT of 3400K.

The light intensity shifting module may communicate instructions to the GPU directing the blue light emitters associated with the display of the operating application program that is not defined as graphics intensive to shift luminous intensity from the default luminous intensity to the blue light luminous intensity associated with the display white point preset coordinated color temperature over the preset duration of time. For example, in an embodiment, the light intensity shifting module may communicate instructions to the GPU directing the blue light emitters associated with the display of the operating application program that is not defined as graphics intensive to shift luminous intensities from the default luminous intensity to 75% of the maximum luminous intensity the blue light emitters are capable of achieving over a period of two hours.

The GPU in an embodiment may receive such instructions from the light intensity shifting module, identify the first subset of blue light emitters as being associated with the operating application program that is not defined as graphics intensive, and direct the first subset of blue light emitters to shift luminous intensity from the default luminous intensity to the blue light luminous intensity associated with the display white point preset coordinated color temperature over the preset duration of time. For example, in an embodiment, the GPU may instruct the first subset of blue light emitters to shift luminous intensities from the default luminous intensity to 75% of the maximum luminous intensity the blue light emitters are capable of achieving over a period of two hours. In such a way, the contextual blue light management system may operate to alter the white point CCT of the portion of the digital display that is not operating a graphics intensive application, while maintaining the default white point CCT of the portion of the digital display that is operating a graphics intensive application, and thus, avoid the problems associated with altering the white point CCT of a digital display operating graphics intensive application programs.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a contextual blue light management system comprising:
   a digital display having a plurality of pixels with
   each pixel having a red light emitter emitting light at a first red light intensity, a green light emitter emitting light at a first green light intensity, and a blue light emitter at a first blue light intensity
   to display a default white point correlated color temperature;
   a processor operatively connected to the digital display and memory for
   operating at least a portion of a contextual blue light management system to receive sensor data indicating a defined condition to select a shift amount to a preset adjusted display white point correlated color temperature over a preset duration of time by a gradual shift of luminous intensity of the first blue light intensity to a second blue light intensity corresponding to the detected defined condition;
   the information handling system executing an application program generating graphics output to the digital display; and
   the processor executing the contextual blue light management system for determining whether the application program generating graphics output is at or below a graphics output intensity level threshold and
   executing the gradual shift of luminous intensity of the blue light emitter from the first blue light intensity to the second blue light intensity when below the graphics output intensity level threshold and inhibiting the gradual shift of luminous intensity of the blue light emitter when the graphics output intensity level threshold is exceeded;

the red light emitter continuing to emit light at the first red light intensity; and the green light emitter continuing to emit light at the first green light intensity.

2. The information handling system operating the contextual blue light management system of claim 1 wherein the gradual shift of luminous intensity of the plurality of the blue light emitters from the first blue light intensity to the second blue light intensity corresponding to the defined detected condition in the one or more internal data records follows one of a linear progression, a curvilinear progression, or a step progression over the preset duration of time.

3. The information handling system operating the contextual blue light management system of claim 2, further comprising:
   a nearby external light source having an adaptive color gamut connected to the processor via a network;
   a network interface device, operatively connected to the processor and the nearby external light source, communicating machine readable executable code instruction to instruct a corresponding shift to the nearby external light source to emit light having an external light source white point coordinated color temperature equivalent to the preset adjusted display white point coordinated color temperature.

4. The information handling system operating the contextual blue light management system of claim 1, wherein the defined detected condition is the processor receiving a threshold difference percentage measurement of a coordinated color temperature of an ambient light source, further comprising:
   an ambient light detector operatively connected to the processor for conducting one or more measurements of the coordinated color temperature of the ambient light; and
   the processor receiving the one or more measurements of the coordinated color temperature of the ambient light source, and determining an average of the measured coordinated color temperature of the ambient light source differs from the white point correlated color temperature of the digital display by at least threshold difference percentage of the value of the white point correlated color temperature of the digital display.

5. The information handling system operating the contextual blue light management system of claim 1, wherein the defined detected condition is the processor receiving a threshold difference percentage measurement of a coordinated color temperature for a nearby external light source, further comprising:
   the nearby external light source having an adaptive color gamut operatively connected to the processor via one or more networks; and
   the processor receiving the one or more measurements of the coordinated color temperature of the nearby external light source, and determining the measured coordinated color temperature of the nearby external light source differs from the white point correlated color temperature of the digital display by at least the threshold difference percentage of the value of the white point correlated color temperature of the digital display.

6. The information handling system operating the contextual blue light management system of claim 1, wherein the defined detected condition is identification of an indication of user fatigue, further comprising:
   a digital camera operatively connected to the processor for capturing one or more digital images of a user;
   the memory operatively connected to the digital camera for storing the one or more digital images of the user captured via the digital camera; and
   the processor analyzing the one or more captured digital images of the user to identify one or more indications of user fatigue.

7. The information handling system operating the contextual blue light management system of claim 1, further comprising:
   the processor identifying that the application program generating graphics output to the digital display has begun execution to exceed the graphics output intensity level threshold; and
   the processor impeding the gradual shift of luminous intensity of the plurality of the blue light emitters from the first blue light intensity to the second blue light intensity.

8. A method for contextually managing digital display blue light intensity comprising:
   emitting light from a digital display having a plurality of pixels each comprising a red light emitter emitting light at a first red light intensity, a green light emitter emitting light at a first green light intensity, and a blue light emitter emitting light at a first green light intensity generating a default white point correlated color temperature;
   receiving and correlating a preset adjusted display white point correlated color temperature, a defined condition under which to display the preset adjusted display white point correlated color temperature, and a preset duration of time;
   determining, via a processor executing a contextual blue light management system, to receive sensor data indicating that a defined detected condition has occurred and selecting a preset adjusted display white point correlated color temperature shift level and a preset duration of time for a gradual shift based on the defined detected condition;
   determining whether an application program is executing to generate graphics output at or below a graphics output intensity level threshold;
   executing, via the processor, a machine readable executable code instruction to perform the gradual shift of luminous intensity of the blue light emitter of each of the plurality of pixels from the first blue light intensity to the second blue light intensity when below the graphics output intensity level threshold to generate the preset adjusted display white point correlated color temperature correlated with the defined detected condition over the preset duration of time and inhibiting the gradual shift of luminous intensity of the blue light emitter when the graphics output intensity level threshold is exceeded; and
   simultaneously maintaining emission of light via the red light emitter and green light emitter of each of the plurality of pixels at the first red light intensity and the first green light intensity.

9. The method for contextually managing digital display blue light intensity of claim 8 wherein the gradual shift of luminous intensity of the plurality of the blue light emitters from the first blue light intensity to the second blue light intensity correlated with the defined detected condition follows one of a linear progression or a curvilinear progression over the preset duration of time.

10. The method for contextually managing digital display blue light intensity of claim 8 wherein the gradual shift of luminous intensity of the plurality of the blue light emitters from the first blue light intensity to the second blue light intensity correlated with the defined detected condition follows a step progression at a plurality of intervals over the preset duration of time.

11. The method for contextually managing digital display blue light intensity of claim 8, further comprising:
   identifying that the application program to generate graphics output to exceed the graphics output intensity level threshold has commenced operating; and
   impeding the gradual shift of luminous intensity of the plurality of the blue light emitters from the the first blue light intensity to the second blue light intensity correlated with the defined detected condition.

12. The method for contextually managing digital display blue light intensity of claim 8, wherein the defined detected condition is receiving a threshold difference percentage measurement of a coordinated color temperature of an ambient light source, further comprising receiving one or more measurements of the coordinated color temperature of the ambient light source, and determining an average measured coordinated color temperature of the ambient light source differs from the default white point correlated color temperature of the digital display by at least the threshold difference percentage of the value of the white point correlated color temperature of the digital display.

13. The method for contextually managing digital display blue light intensity of claim 12, further comprising communicating machine readable executable code instruction to instruct the nearby external light source to emit light having an external light source white point coordinated color temperature equivalent to the preset adjusted display white point coordinated color temperature.

14. The method for contextually managing digital display blue light intensity of claim 8 further comprising:
   determining that a second defined detected condition has occurred; and
   performing a second gradual shift of luminous intensity of the plurality of blue light emitters to a third blue light intensity correlated with the second defined detected condition over a second preset duration of time.

15. An information handling system operating a contextual blue light management system comprising:
   a digital display having a plurality of blue light emitters, emitting light at a default luminous intensity to display a default white point correlated color temperature;
   the digital display having a first display pixel region displaying an output of a first application program having a first graphics intensity level and a second display pixel region displaying an output of a second application program having a second graphics intensity level;
   a graphics processing unit operatively connected to the digital display operating to adjust luminous intensity of a first subset of the plurality of blue light emitters for the first display pixel region, and luminous intensity of a second subset of the plurality of the blue light emitters for the second display pixel region;
   the graphics processing unit operating the contextual blue light management system to receive and correlate a first preset adjusted display white point correlated color temperature, a first defined condition under which to display the first preset adjusted display white point correlated color temperature, and a first preset duration of time;
   the graphics processing unit determining the first defined condition has occurred, the first application program and second application program are currently operating, the first graphics intensity level is below a preset graphics intensity level, and the second graphics intensity level is above the preset graphics intensity level;
   the graphics processing unit performing a first gradual shift of luminous intensity of the first subset of the plurality of blue light emitters associated with the first display pixel region displaying the output of the first application program having the first graphics intensity level from the default luminous intensity to the blue light luminous intensity value correlated with the first defined condition over the first preset duration of time; and
   the graphics processing unit maintaining the default luminous intensity of the second subset of the plurality of the blue light emitters associated with the second display pixel region displaying the output of the second application program having the second graphics intensity level.

16. The information handling system operating the contextual blue light management system of claim 15 wherein the first gradual shift of the first subset of the plurality of blue light emitters associated with the first display pixel region displaying the output of the first application program having the first graphics intensity level from the default luminous intensity to the blue light luminous intensity value correlated with the first defined condition follows one of a linear progression, a curvilinear progression, or a step progression over the first preset duration of time.

17. The information handling system operating the contextual blue light management system of claim 16 further comprising:
   the graphics processing unit operating the contextual blue light management system to receive and correlate a second preset adjusted display white point correlated color temperature, a second defined condition under which to display the second preset adjusted display white point correlated color temperature, and a second preset duration of time;
   the graphics processing unit determining the second defined condition has occurred; and
   the graphics processing unit performing a second gradual shift of luminous intensity of the first subset of the plurality of blue light emitters associated with the first display pixel region displaying the output of the first application program having the first graphics intensity level from the blue light luminous intensity value correlated with the first defined condition to the blue light luminous intensity value correlated with the second defined condition over the second preset duration of time.

18. The information handling system operating the contextual blue light management system of claim 16, wherein the first defined condition is the processor receiving a threshold difference percentage measurement of a coordinated color temperature of an ambient light source, further comprising:
   an ambient light detector operatively connected to the processor for conducting one or more measurements of the coordinated color temperature of the ambient light source; and the graphics processing unit receiving the one or more measurements of the coordinated color temperature of the ambient light source, and determining the average measured coordinated color temperature of the ambient light source differs from the default white point correlated color temperature of the digital display by at least the threshold difference percentage of the value of the default white point correlated color temperature of the digital display.

19. The information handling system operating the contextual blue light management system of claim 16, wherein the first gradual shift of luminous intensity of the plurality of the blue light emitters from the default luminous intensity to the blue light luminous intensity value correlated with the defined condition follows a step progression at a plurality of intervals over the preset duration of time.

20. The information handling system operating the contextual blue light management system of claim 16 further comprising:

the graphics processing unit the contextual blue light management system to receive and correlate a second preset adjusted display white point correlated color temperature, a second defined condition under which to display the second preset adjusted display white point correlated color temperature, and a second preset duration of time;

the graphics processing unit determining the second defined condition has occurred; and the graphics processing unit performing a second gradual shift of luminous intensity of the second subset of the plurality of blue light emitters associated with the second display pixel region displaying the output of the second application program having the second graphics intensity level from the blue light luminous intensity value correlated with the second defined condition to the blue light luminous intensity value correlated with the second defined condition over the second preset duration of time.

* * * * *